US012794635B2

(12) United States Patent
Guan et al.

(10) Patent No.: US 12,794,635 B2
(45) Date of Patent: Nov. 10, 2026

(54) METHOD AND USER EQUIPMENT FOR L1-RSRP MEASUREMENT

(71) Applicant: NEC CORPORATION, Tokyo (JP)

(72) Inventors: Peng Guan, Beijing (CN); Gang Wang, Beijing (CN); Yukai Gao, Beijing (CN)

(73) Assignee: NEC CORPORATION, Tokyo (JP)

( * ) Notice: Subject to any disclaimer, the term of this patent is extended or adjusted under 35 U.S.C. 154(b) by 264 days.

(21) Appl. No.: 18/706,985

(22) PCT Filed: Nov. 5, 2021

(86) PCT No.: PCT/CN2021/129095

§ 371 (c)(1),
(2) Date: May 2, 2024

(87) PCT Pub. No.: WO2023/077454

PCT Pub. Date: May 11, 2023

(65) Prior Publication Data

US 2025/0167953 A1 May 22, 2025

(51) Int. Cl.
*H04L 5/00* (2006.01)
*H04B 7/06* (2006.01)
*H04W 72/21* (2023.01)

(52) U.S. Cl.
CPC ....... *H04L 5/0051* (2013.01); *H04B 7/06968* (2023.05); *H04L 5/0035* (2013.01); *H04L 5/0053* (2013.01); *H04W 72/21* (2023.01)

(58) Field of Classification Search
CPC ... H04L 5/0051; H04L 5/0035; H04L 5/0053; H04L 5/0048; H04L 5/001; H04L 5/0023;
(Continued)

(56) References Cited

U.S. PATENT DOCUMENTS

2020/0229104 A1 7/2020 Molavianjazi et al.
2021/0219366 A1* 7/2021 Matsumura .......... H04B 7/0695
(Continued)

FOREIGN PATENT DOCUMENTS

CN 109314871 A 2/2019
CN 111095857 A 5/2020
(Continued)

OTHER PUBLICATIONS

ZTE, "Enhancements on Multi-beam Operation", 3GPP TSG RAN WG1 Meeting #106bis-e, R1-2108870, 2021, 26 pages.
(Continued)

*Primary Examiner* — Brian T Le
(74) *Attorney, Agent, or Firm* — Sughrue Mion, PLLC

(57) ABSTRACT

Example embodiments of the present disclosure relate to an effective mechanism for handing the scenario of discontinuous coverage. In this solution, the terminal device generates at least one beam report based on an active transmission configuration indicator (TCI) state of the terminal device, where the terminal device is configured with at least one of a serving cell associated with a first physical cell identity (PCI) and a neighbor cell associated with a second PCI. The terminal device further transmits the at least one beam measurement report in the serving cell or in the neighbor cell. In this way, the number of reporting the useless and unnecessary measurements result is reduced.

8 Claims, 10 Drawing Sheets

(58) Field of Classification Search
CPC ............. H04W 72/21; H04W 36/0058; H04W 36/085; H04B 7/06968; H04B 7/024; H04B 17/252; H04B 17/328
See application file for complete search history.

(56) References Cited

U.S. PATENT DOCUMENTS

| | | | |
|---|---|---|---|
| 2021/0314052 A1 | 10/2021 | Turtinen et al. | |
| 2022/0022065 A1 | 1/2022 | Wang et al. | |
| 2023/0163914 A1* | 5/2023 | Koskela | H04L 5/0053 370/242 |
| 2023/0232313 A1 | 7/2023 | Ji et al. | |
| 2024/0373268 A1 | 11/2024 | Wang et al. | |
| 2025/0240682 A1* | 7/2025 | Chandrashekar | H04W 36/0085 |

FOREIGN PATENT DOCUMENTS

| | | |
|---|---|---|
| CN | 112753171 A | 5/2021 |
| CN | 113016156 A | 6/2021 |
| KR | 2021-0037322 A | 4/2021 |
| WO | 2019/220649 A1 | 11/2019 |
| WO | 2021/214377 A1 | 10/2021 |

OTHER PUBLICATIONS

Samsung, "Moderator summary#4 for multi-beam enhancement: Round 3", 3GPP TSG RAN WG1 #106bis-e, R1-2110549, 2021, 29 pages.
International Search Report for PCT/CN2021/129095 dated Sep. 29, 2022.
Written Opinion for PCT/CN2021/129095 dated Sep. 29, 2022.
Nokia et al., "Discussion on requirements of inter-cell beam management", 3GPP TSG-RAN WG4 Meeting # 101-e, R4-2119013, Nov. 1-12, 2021, pp. 1-11.
Ericsson, "Discussion on RRM requirements of inter-cell BM in FeMIMO", 3GPP TSG RAN WG4 Meeting #101-e, R4-2118757, Nov. 1-12, 2021, pp. 1-5.
Extended European Search Report issued Dec. 5, 2024 in Application No. 21962967.2.
JP Office Action for JP Application No. 2024-526520, mailed on Apr. 1, 2025 with English Translation.
Intel Corporation, "Enhancements to Multi-Beam Operation", 3GPP TSG RAN WG1 #106-e R1-2107570, Aug. 7, 2021, p. 1-p. 22.
3rd Generation Partnership Project, Technical Specification Group Radio Access Network; NR; Physical layer procedures for control (Release 16), 3GPP TS 38.213 V16.7.0 (Sep. 2021), Sep. 28, 2021,p. 1-p. 188.
Apple Inc., "Views on Rel-17 FeMIMO UE features", 3GPP TSG RAN WG1 #106-e R1-2110065, Oct. 2, 2021, p. 1-p. 11.
Intel Corporation, "UE features for NR feMIMO", 3GPP TSG RAN WG1 #106bis-e R1-2109642, Oct. 2, 2021, p. 1-p. 11.
JP Office Action for JP Application No. 2024-526520, mailed on Jun. 24, 2025 with English Translation.
Ericsson, "On beam management enhancements for simultaneous multi-TRP transmission with multi-panel reception", 3GPP TSG RAN WG1 #104b-e R1-2103545, Apr. 7, 2021.
Indian Official Communication for IN Application No. 202417043695, mailed on Jun. 12, 2026.
5G; NR; Physical layer procedures for control, 3GPP TS 38.213 version 16.3.0 Release 16, ETSI TS 138 213 V16.3.0 (Nov. 2020) URL:https://www.etsi.org/deliver/etsi_ts/138200_138299/138213/16.03.00_60/ts_138213v160300p.pdf.

* cited by examiner

METHOD AND USER EQUIPMENT FOR L1-RSRP MEASUREMENT

CROSS REFERENCE TO RELATED APPLICATIONS

This application is a National Stage of International Application No. PCT/CN2021/129095 filed Nov. 5, 2021.

FIELD

Example embodiments of the present disclosure generally relate to the field of communication techniques and in particular, to methods, devices, and medium for beam measurement and reporting.

BACKGROUND

Wireless communication networks are widely deployed and can support various types of service applications for terminal devices (i.e., user equipment, UEs). Many communication schemes have been proposed to support the rapidly increasing data traffic. For example, in current wireless communication network, a terminal device may be configured with more than one cell including a serving cell and optionally including at least one neighbor cell. Further, in both of the serving cell and the neighbor cell(s), the communication between the network device and the terminal device may be performed with more than one beam. Beam management is used for maintaining the beams in the network, such that the performance of the communication network is improved. During the beam management procedure, the network device may configure and trigger a beam measurement and the terminal device may perform the beam measurement and reporting the measurement results to the network device.

SUMMARY

In general, example embodiments of the present disclosure provide a solution for beam measurement and reporting. Embodiments that do not fall under the scope of the claims, if any, are to be interpreted as examples useful for understanding various embodiments of the disclosure.

In a first aspect, there is provided a method of communication. The method comprises: generating, at a terminal device, at least one beam report based on an active transmission configuration indicator (TCI) state of the terminal device, the terminal device being configured with at least one of a serving cell associated with a first physical cell identity (PCI) and a neighbor cell associated with a second PCI. The method further comprises: transmitting the at least one beam measurement report in the serving cell or in the neighbor cell.

In a second aspect, there is provided a method of communication. The method comprises: generating, at a terminal device, at least one beam measurement report indicating: a first absolute value of a measurement result for the serving cell, and a second absolute value of a measurement result for the neighbor cell. The method further comprises: transmitting the at least one beam measurement report in a serving cell or in a neighbor cell.

In a third aspect, there is provided a method of communication. The method comprises: obtaining, at a terminal device configured with a recovery threshold in a first cell, a measurement result of a reference signal (RS) associated with a second cell, the RS being a synchronization signal blocks (SSB) or channel state information-reference signal (CSI-RS). The method further comprises: during a beam failure recovery procedure, applying the recovery threshold to measurement result obtained for the RS associated with the second cell after scaling the measurement result by a pre-configured offset, the pre-configured offset 1s being one of the following: an offset defined by event-driven beam reporting or event-driven cell switch, or a transmit power difference between the first cell and the second cell.

In a fourth aspect, there is provided a method of communication. The method comprises: generating, at a terminal device, a power headroom message, the terminal device being configured with at least one of a serving cell associated with a first physical cell identity (PCI) and a neighbor cell associated with a second PCI, the power headroom message comprising at least one of the following: a first set of power control parameter associated with the serving cell, the first set of power control parameter comprising a least one power control parameter for a RS associated with the serving cell, or a second set of power control parameter associated with the neighbor cell. The method further comprises: transmitting the power headroom message in the serving cell or in the neighbor cell.

In a fifth aspect, there is provided a method of communication. The method comprises: transmitting, at a network device, a message to trigger a beam measurement. The method further comprises: receiving, from a terminal device, at least one beam measurement report generated by the terminal device based on an active TCI state of the terminal device.

In a sixth aspect, there is provided a method of communication. The method comprises: receiving, at a first device providing a serving cell for a terminal device or a second device providing a neighbor cell for the terminal device, at least one beam measurement from the terminal device, the at least one beam measurement report indicating: a first absolute value of a measurement result for the serving cell, and a second absolute value of a measurement result for the neighbor cell.

In a seventh aspect, there is provided a method of communication. The method comprises: receiving, at a first network device providing a serving cell associated with a first PCI or a second device providing a neighbor cell associated with a second PCI, a power headroom message from a terminal device, the power headroom message comprising at least one of the following: a first set of power control parameter corresponding to the first PCI, the first set of power control parameter comprising a power control parameter for a RS corresponding to the first PCI, or a second set of power control parameter corresponding to a second PCI associated with a neighbor cell of the terminal device.

In an eighth aspect, there is provided a terminal device. The terminal device includes a processing unit; and a memory coupled to the processing unit and storing instructions thereon, the instructions, when executed by the processing unit, causing the device to perform the method according to the first aspect.

In a ninth aspect, there is provided a terminal device. The terminal device includes a processing unit; and a memory coupled to the processing unit and storing instructions thereon, the instructions, when executed by the processing unit, causing the device to perform the method according to the second aspect.

In a tenth aspect, there is provided a terminal device. The terminal device includes a processing unit; and a memory coupled to the processing unit and storing instructions thereon, the instructions, when executed by the processing unit, causing the device to perform the method according to the third aspect.

In an eleventh aspect, there is provided a terminal device. The terminal device includes a processing unit; and a memory coupled to the processing unit and storing instructions thereon, the instructions, when executed by the processing unit, causing the device to perform the method according to the fourth aspect.

In a twelfth aspect, there is provided a network device. The network device includes a processing unit; and a memory coupled to the processing unit and storing instructions thereon, the instructions, when executed by the processing unit, causing the device to perform the method according to the fifth aspect.

In a thirteenth aspect, there is provided a network device. The network device includes a processing unit; and a memory coupled to the processing unit and storing instructions thereon, the instructions, when executed by the processing unit, causing the device to perform the method according to the sixth aspect.

In a fourteenth aspect, there is provided a network device. The network device includes a processing unit; and a memory coupled to the processing unit and storing instructions thereon, the instructions, when executed by the processing unit, causing the device to perform the method according to the seventh aspect.

In a fifteenth aspect, there is provided a computer readable medium having instructions stored thereon, the instructions, when executed on at least one processor, causing the at least one processor to carry out the method according to any of the above first to seventh aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
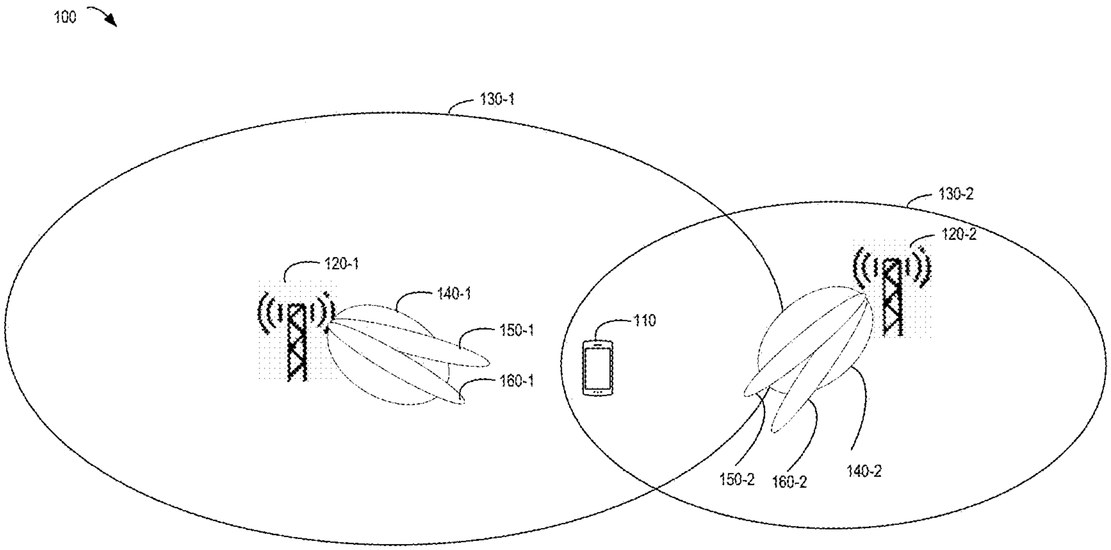
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), 5.5G, 5G-Advanced networks, or the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Ultra-reliable and Low Latency Communications (URLLC) devices, Internet of Everything (IoE) devices, machine type communication (MTC) devices, device on vehicle for V2X communication where X means pedestrian, vehicle, or infrastructure/network, devices for Integrated Access and Backhaul (IAB), Space borne vehicles or Air borne vehicles in Non-terrestrial networks (NTN) including Satellites and High Altitude Platforms (HAPs) encompassing Unmanned Aircraft Systems (UAS), eXtended Reality (XR) devices including different types of realities such as Augmented Reality (AR), Mixed Reality (MR) and Virtual Reality (VR), the unmanned aerial vehicle (UAV) commonly known as a drone which is an aircraft without any human pilot, devices on high speed train (HST), or image capture devices such as digital cameras, sensors, gaming devices, music storage and playback appliances, or Internet appliances enabling wireless or wired Internet access and browsing and the like. The 'terminal device' can further has 'multicast/broadcast' feature, to support public safety and mission critical, V2X applications, transparent IPv4/IPv6 multicast delivery, IPTV, smart TV, radio services, software delivery over wireless, group communications and IoT applications. It may also be incorporated one or multiple Subscriber Identity Module (SIM) as known as Multi-SIM. The term "terminal device" can be used interchangeably with a UE, a mobile station, a subscriber station, a mobile terminal, a user terminal or a wireless device.

As used herein, the term "network device" refers to a device which is capable of providing or hosting a cell or coverage where terminal devices can communicate. Examples of a network device include, but not limited to, a satellite, a unmanned aerial systems (UAS) platform, a Node B (NodeB or NB), an evolved NodeB (eNodeB or eNB), a next generation NodeB (gNB), a transmission reception point (TRP), a remote radio unit (RRU), a radio head (RH), a remote radio head (RRH), an IAB node, a low power node such as a femto node, a pico node, a reconfigurable intelligent surface (RIS), and the like.

The terminal device or the network device may have Artificial intelligence (AI) or Machine learning capability. It generally includes a model which has been trained from numerous collected data for a specific function, and can be used to predict some information.

The terminal or the network device may work on several frequency ranges, e.g. FR1 (410 MHz-7125 MHz), FR2 (24.25 GHz to 71 GHz), frequency band larger than 100 GHz as well as Tera Hertz (THz). It can further work on licensed/unlicensed/shared spectrum. The terminal device may have more than one connection with the network devices under Multi-Radio Dual Connectivity (MR-DC) application scenario. The terminal device or the network device can work on full duplex, flexible duplex and cross division duplex modes.

The embodiments of the present disclosure may be performed in test equipment, e.g. signal generator, signal analyzer, spectrum analyzer, network analyzer, test terminal device, test network device, channel emulator.

The embodiments of the present disclosure may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols, 5.5G, 5G-Advanced networks, or the sixth generation (6G) networks.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As discussed above, in current wireless communication network, a terminal device may be configured with more than one cell including a serving cell and optionally including at least one neighbor cell (also referred to as "non-serving cell" sometimes), which is referred to as an inter-cell scenario hereafter. During the scenario of inter-cell, RSs, such as, a SSB or a CSI-RS, are transmitted from both serving cell and neighbor cell to the terminal device.

In addition to the above, in the 3rd-generation partnership project (3GPP) release 17 (Rel-17), a technology of unified TCI state, or Rel-17 TCI state, is introduced and some agreements with regards to the unified TCI state have been made, including:

For intra-cell beam indication, the following downlink (DL) RSs can share the same indicated Rel-17 TCI state as UE-dedicated reception on physical downlink shared channel (PDSCH) and for UE-dedicated reception on all or subset of CORESETs in a component carrier (CC):

Demodulation reference signals (DMRSs) associated with non-UE-dedicated reception on CORESET(s) and the associated PDSCH; and It is pending about non-UE-dedicated physical uplink control channel (PUCCH), and non-UE-dedicated PUSCH.

For inter-cell beam management, the supported Rel-17 medium access control (MAC)-control element (CE)-based (MAC-CE-based) and/or downlink control information-based (DCI-based) beam indication (at least using DCI formats 1_1/1_2 with and without DL assignment including the associated MAC-CE-based TCI state activation) applies to:

The channels and signals as for intra-cell beam management except for non-UE dedicated channels/signals; and For the aforementioned applicable channels and signals, SSB associated with a physical cell identity (PCI) different from that of the serving cell is used as an indirect Quasi Co-location (QCL) reference for DL TCI (in case of separate DL/uplink (UL) TCI) or joint TCI, or an indirect/direct QCL reference for UL TCI (in case of separate DL/UL TCI). Further, when a RS (be represented as "RS X") is an indirect QCL reference of a target channel, there exists at least one other source signal on the QCL chain between RS X and the target channel. Here, 3GPP release 15/16 (Rel-15/16) QCL rule is reused by replacing SSB with SSB associated with a PCI different from that of the serving cell.

For inter-cell beam management, the support of more than one Rel-17 active DL TCI state/QCL per band is a UE capability.

If UE does not support such capability, MAC-CE based beam indication (activation of one TCI state) can be used to switch between two different DL receptions along two different beams. Further, it should be noted that the serving cell does not change when beam selection is done;

It does not preclude the possibility for timing advance (TA) update on non-serving cell; and It is still pending that up to 5 CORESETs can be configured per BWP or a UE supporting Rel.17 beam indication feature for inter-cell beam management.

In addition to the above, in 3GPP Rel-17, in order to enable selection of neighbor cell beam, it is proposed that layer 1-reference signal received power (L1-RSRP) report for inter-cell BM is supported. So far, some agreements with regards to the L1-RSRP report have been made, including:

On Rel.17 multi-beam measurement/reporting enhancements for L1/layer 2 (L2)-centric inter-cell mobility and inter-cell multi-transmission/reception point (mTRP), In one reporting instance, depending on NW configuration, beam(s) associated with a non-serving cell can be mixed with that associated with serving-cell;

It is pending about whether this applies to periodic, semi-persistent, and/or aperiodic; and It is pending about how to report the K beams and corresponding qualities if the transmit (Tx) power among the non-serving cell and with serving-cell is not the same.

On Rel-17 enhancements for inter-cell beam management and inter-cell mTRP, some alternatives are proposed, including:

Alternative 1: Rel-15 L1-RSRP reporting format is reused for all L1-RSRP(s) in one L1-RSRP reporting instance, i.e. for K>1, (K−1) 4-bit differential L1-RSRP(s) calculated relative to the reference (absolute) 7-bit L1-RSRP; and Alternative 2: differential L1-RSRP per PCI is used: When more than one L1-RSRP(s) associated with a same PCI are reported, Rel-15 L1-RSRP reporting format is used for L1-RSRP(s) associated with the same PCI, i.e. 4-bit differential L1-RSRP (s) calculated relative to the PCI-specific reference (absolute) 7-bit L1-RSRP.

On Rel-17 enhancements for inter-cell beam management and inter-cell mTRP, the L1-RSRP reporting reuses Rel-15 L1-RSRP table.

On Rel.17 L1-RSRP multi-beam measurement/reporting enhancements for inter-cell beam management and inter-cell mTRP, in RAN1 #106bis-e, select one of the following alternatives:

Alternative 1: support L1-based event-driven beam reporting for inter-cell beam management and inter-cell mTRP;

Alternative 2: support MAC CE based event-driven beam reporting for inter-cell beam management and inter-cell mTRP; and Alternative 3: in Rel-17, event-driven beam reporting is not supported for inter-cell beam management and inter-cell mTRP.

Although some discussions and proposals have been made for beam measurement and reporting, there are still multiple pending issues needed to be addressed.

One of the pending issues is how to configure the beam measurement for the neighbor cell. Another pending issue is how to achieve an effective reporting for the inter-cell beam information. For example, by an indication of serving TCI states or neighbor cell TCI states, a fast switch between the serving cell and the neighbor cell is supported. Under the scenario of inter-cell, measurement results for both the serving cell and the neighbor cell will be generated. However, not all the measurement results are useful and necessary. So far, there is no solution about how to reduce the number of reporting the useless and unnecessary measurement results.

In addition, the conventional solution of LT-RSRP report is implemented in a differential mode, where the maximum supported quantized difference from the highest RSRP reported is 30 dB. Further, when the difference is larger than 30 dB, the measurement results cannot be reported, or, would be reported as 'out-of-range' with 4-bit value "1111". Further, in the conventional solution, SSB power can be indicated by higher layer parameter ss-PBCH-BlockPower within the range (−60 . . . 50) dBm, which suggests a very large variation in Tx power. Therefore, for the inter-cell scenario, some useful measurement result cannot be reported successfully due to the transmit power in the serving cell and the neighbor cell may be configured separately and be configured with a lager transmit power difference.

Other example pending issues including that conventional solution of cell switch procedure does not consider the beam recovery condition, and the power headroom report (PHR) are reported merely for the serving cell and so on.

It should be understood that the above illustrated issues are only for the purpose of illustration without suggesting any limitations. Both of the pending issues and the issues addressed by the present disclosure also are not limited to the above illustrated issues.

In the following text, some example embodiments are discussed under the scenario of inter-cell merely for better understanding. It should be understood that the embodiments described herein may be implemented under both inter-cell and intra-cell scenario unless there is a clear literal statement.

Further, in the following text, some example embodiments are discussed with regard to a specific scenario of inter-cell where a serving cell and a neighbor cell are configured in the communication network merely for better understanding. It is to be understood that the number of the serving cell(s) may be more than one, and the number of the neighbor cell(s) may be more than one and different neighbor cells may be associated/configured with different PCIs.

In the following, a L1-RSRP/L1-signal to interference and noise ratio (L1-SINR) will be used as an example of beam quality for describing some specific example embodiments of the present disclosure. It is to be understood that example embodiments described with regard to the L1-RSRP may be equally applicable to other type of beam quality, including but not limited to L1/L3-RSRP, L1/L3-SINR, L1/L3 received signal strength indicator (RSSI), L1/L3 reference signal received quality (RSRQ), and so on. The present disclosure is not limited in this regard.

For ease of discussion, some terms and expressions used in the following description are listed as below:

Term "serving cell": be described as a cell with a PCI/a first PCI or a cell associated with a PCI/a first PCI;

Term "neighbor cell": a cell with a different PCI from serving cell, a cell with a second PCI, a cell associated with a different PCI from serving cell or a cell associated with a second PCI; also may be referred to as "non-serving cell" sometime;

Term "serving cell RS": SSBs/CSI-RSs/SRSs and other RS(s) associated with the serving cell;

Term "serving cell SSB": SSB associated with the serving cell;

Term "serving cell CSI-RS": CSI-RS associated with the serving cell SSB;

Term "serving cell SRS": SRS associated with the serving cell SSB;

Term "neighbor cell RS": SSBs/CSI-RSs/SRSs and other RS(s) associated with the neighbor cell;

Term "neighbor cell SSB": SSB associated with the neighbor cell;

Term "neighbor cell CSI-RS": CSI-RS associated with the neighbor cell SSB;

Term "neighbor cell SRS": SRS associated with the neighbor cell SSB;

Term "serving cell TCI state": TCI states directly or indirectly linked to the serving cell RS;

Term "neighbor cell TCI state": TCI states directly or indirectly linked to the neighbor cell RS;

Term "active TCI state": be indicated by a message/signalling (such as, DCI message, RRC, MAC CE and so on) from a network device;

Beam index/identify (ID): may be identified by a resource indicator/ID, such as, an indicator/ID of a RS (such as, SSB, CSI-RS and SRS).

In this present disclosure, some terms may refer to same or similar physical meaning and may be used interchangeably. Some exemplary examples are listed as below.

The terms "RS", "RS resource" can be used interchangeably;

The terms "active TCI state", "activated TCI state", "applied TCI state", "indicated TCI state", "TCI state indicated in TCI filed in DCI", "current TCI state", "assumed TCI state", can be used interchangeably;

The terms "transmission", "transmission occasion" and "repetition" can be used interchangeably;

The terms "beam failure", "link failure" and "radio link failure" can be used interchangeably;

The terms "recovery threshold", "$Q_{in}$ threshold", "in-sync threshold", "new beam threshold", and "candidate beam threshold" can be used interchangeably;

The terms "precoder", "precoding", "precoding matrix", "beam", "spatial relation information", "spatial relation info", "TPMI", "precoding information", "precoding information and number of layers", "precoding matrix indicator (PMI)", "precoding matrix indicator", "transmission precoding matrix indication", "precoding matrix indication", "TCI state", "transmission configuration indicator", "quasi co-location (QCL)", "quasi-co-location", "QCL parameter", "QCL assumption", "QCL relationship" and "spatial relation" can be used interchangeably;

The terms "SRS resource index (SRI)", "SRS resource set index", "UL TCI", "UL spatial domain filter", "UL beam", "joint TCI" can be used interchangeably.

Example Environment

FIG. 1 shows an example communication environment 100 in which example embodiments of the present disclosure can be implemented.

The communication network 100 includes a terminal device 110, a network device 120-1 and a network device 120-2. In the following text, the network devices 120-1 and 120-2 are referred to as the first terminal network 120-1 and the second network device 120-2, respectively.

In the specific example pf FIG. 1, the first network device 120-1 provides a serving cell 130-1 for the terminal device 110 and the second network device 120-2 provides a neighbor cell 130-2 for the terminal device 110.

One or more beams/RSs may be configured either in the serving cell 130-1 or the neighbor cell 130-2. Merely for better understanding, in the specific example of FIG. 1, beam 140-1 is associated with the serving cell 130-1 and used as a Tx beam for a SSB #1 associated with the serving cell 130-1. Further, beams 150-1 and 160-1 are associated with the serving cell 130-1 and used as Tx beam for CSI-RS #1 and CSI-RS #2, and beam for CSI-RS #1 and CSI-RS #2 are associated with both of the serving cell 130-1 and the SSB #1.

Similarly, in the specific example of FIG. 1, beam 140-2 is associated with the neighbor cell 130-2 and used as a Tx beam for a SSB #2 associated with the neighbor cell 130-2. Further, beams 150-2 and 160-2 are associated with the neighbor cell 130-2 and used as Tx beam for CSI-RS #3 and CSI-RS #4, and beam for CSI-RS #1 and CSI-RS #2 are associated with both the neighbor cell 130-2 and the SSB #2.

In the environment 100, a link from the network device 120 to the terminal device 110 is referred to as a DL, while a link from the terminal device 110 to the network device 120 is referred to as UL. In DL, the network device 120 is a transmitting device (or a transmitter) and the terminal device 110 is a receiving device (or a receiver), and the network device 120 may transmit a DL transmission to the terminal device 110 via one or more beams. In UL, the network device 120 is a receiving device (or a receiver) and the terminal device 110 is a transmitting device (or a transmitter).

In addition, type of TCI state may be introduced and defined according to the present disclosure. The type of TCI state may be one of the following: serving cell TCI state, neighbor cell TCI state, DL/UL joint TCI state, DL only TCI state, UL only TCI state, Rel-17 TCI state, Rel-15/16 TCI state and so on. Different types of TCI state may relate to different RS set. As one example, for neighbor cell TCI state, CSI-RS #3 or CSI-RS #4 may be used as QCL source/reference RS. As another example, for neighbor cell UL-Only TCI state, SSB #2, CSI-RS #3 or CSI-RS #4 may be used as Tx beam reference.

The communications in the communication environment 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G), 5.5G, 5G-Advanced networks, or the sixth generation (6G) communication protocols.

It is to be understood that the numbers of devices (i.e., the terminal device 110, the network device 120) and their connection relationships and types shown in FIG. 1 are only for the purpose of illustration without suggesting any limitation. The communication network 100 may include any suitable numbers of devices adapted for implementing embodiments of the present disclosure.

Example Processes

It should be understood that although feature(s)/operation(s) are discussed in specific example embodiments separately, unless clearly indicated to the contrary, these feature(s)/operation(s) described in different example embodiments may be used in any suitable combination.

In the following description, expression "highest" is used in some example embodiments. In this present disclosure, expression "highest" does not refer to the unique highest value, but may refer to a relative highest value. Specifically, the highest value may refer to the n-th highest value, for example, the 2nd highest, the 3rd highest and so on, where n is larger than '0';

In addition, in the following description, a value quality parameters (such as, L1-RSRP, L1-SINR, and so on) may refer to a measured value, a reported value, a scaled value and so on.

For example, expression "highest L1-RSRP" may at least refer to "the n-th highest L1-RSRP of all measured RS", "the n-th highest L1-RSRP of all reported RS", "the n-th highest L1-RSRP of all scaled RS" and so on. Further, "highest L1-RSRP" may be equally replaced by other quality parameters (such as, L1/L3-RSRP, L1/L3-SINR, L1/L3 RSSI, L1/L3 RSRQ, and so on).

Principle and implementations of the present disclosure will be described in detail below with reference to FIG. 2, which shows a signaling chart illustrating a process 200 of communication according to some example embodiments of the present disclosure. For the purpose of discussion, the process 200 will be described with reference to FIG. 1. The process 200 may involve the terminal device 110 and the network device 120 (either the first network device 120-1 or the second network device 120-2). Further, in the specific example of FIG. 2, the first network device 120-1 provides a serving cell 130-1 for the terminal device 110 and the serving cell 130-1 is associates with a first PCI. Further, the second network device 120-2 provides a neighbor cell 130-2 for the terminal device 110 and the neighbor cell 130-2 is associates with a second PCI.

Optionally, the terminal device 110 and the network device 120 may communicate capability-related information and related measurement configuration to enable the embodiments according to the present disclosure, which will be discussed as below. During this interactive procedure, certain rules for configuring and reporting the measurement result may be stipulated, and the related re-defined/newly-introduced parameters may be exchanged between the terminal device 110 and the network device 120.

Figure 2:
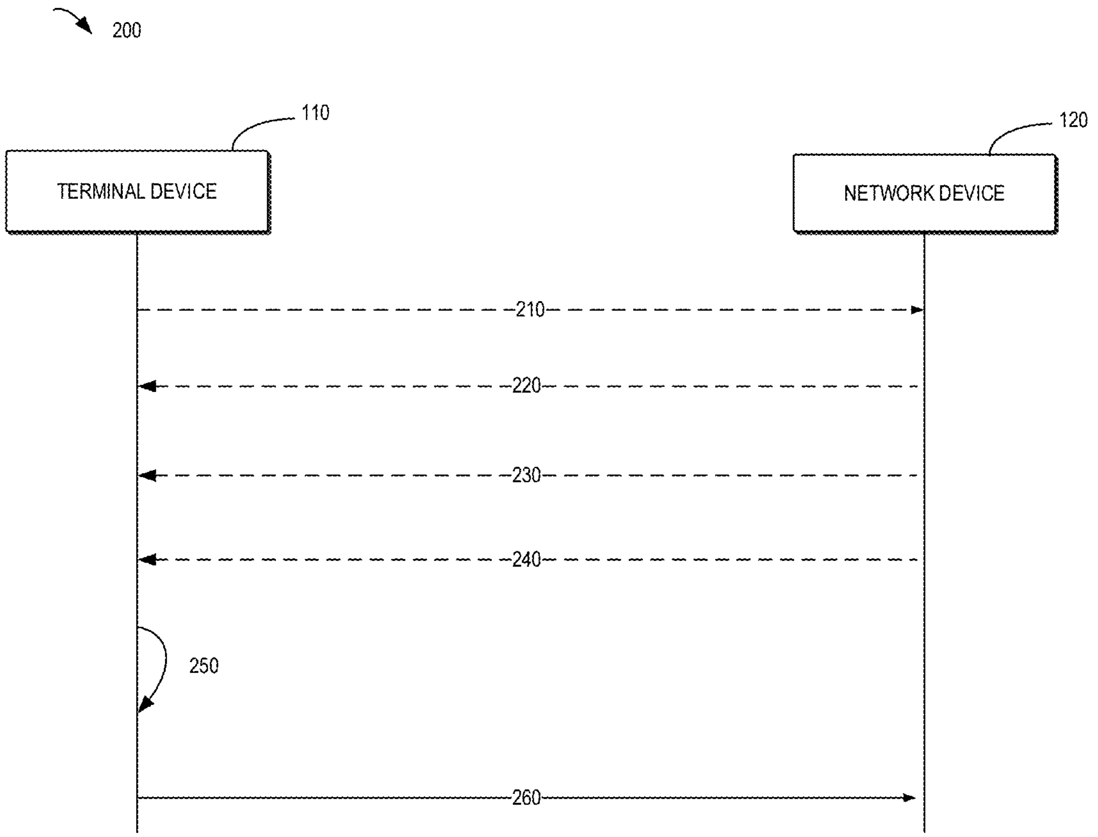
FIG. 2 illustrates a signaling chart illustrating a process for communication according to some embodiments of the present disclosure.

As illustrated in FIG. 2, the terminal device 110 transmits 210 capability-related information to the network device 120. Alternatively, on in addition, the network device 120 transmits 220 a measurement configuration to the terminal device 110.

In addition, the capability-related information and the measurement configuration may be carried in any suitable signalling/message(s), including but not limited to radio resource control (RRC) message, DCI message, MAC CE and so on.

In this way, the existing signaling structure may be reused and updated to accommodate to the inter-cell beam measurement and reporting.

One example of the capability-related information is whether the terminal device 110 supports to generate at least one measurement report based on an active TCI state of the terminal device 110. Additionally, in case that the type of (active) TCI state is introduced, the capability-related information also may indicate that whether the terminal device 110 supports to determine the report content (i.e., generate at least one measurement report) based on the type of (active) TCI states.

Another example of the capability-related information is whether the terminal device 110 supports to configure serving cell RS and neighbor cell RS for one L1-RSRP reporting instance, or in one resource set for L1-RSRP report. Alternatively, or in addition, the capability-related information also may indicate whether the terminal device 110 supports to scale the measurement result (such as, measured L1-RSRP). In this way, L1-RSRP report of neighbor cell RS is enabled.

A further example of the capability-related information is the maximum numbers in a report/resource set of serving cell SSB, neighbor cell SSB, serving cell CSI-RS, neighbor cell CSI-RS, respectively.

As discussed above, the network device 120 also may transmit the measurement configuration to the terminal device 110. In one example embodiment, the measurement configuration may be generated based on the capability-related information received from the terminal device 110. In another example embodiment, the measurement configuration is generated independently from the capability-related information (i.e. without requiring any capability-related information from the terminal device 110).

In some embodiments, the terminal device 110 may receive a higher layer configuration (i.e., measurement configuration, via such as a RRC message) from the network device 120. Further, the higher layer configuration may indicate/include a cell related configuration. For example, the higher layer configuration includes a cell-specific configuration, including parameters of PCI, cell id, SSB transmit power and so on.

Alternatively, or in addition, in some embodiments, the higher layer configuration may indicate/include a measurement and report related configuration. For example, the higher layer configuration may indicate report quantities, such as, SSB Resource Indicator (SSBRI)-RSRP, CSI-RS resource indicator (CRI)-RSRP, SSBRI-SINR, CRI-SINR and so on.

Alternatively, or in addition, in some embodiments, the higher layer configuration may indicate/include information (such as, an indication) to enable the improved measurement and reporting solutions discussed in the present disclosure. In one example embodiment, the measurement configuration indicates information for enabling the terminal device 110 to generate the at least one measurement report based on the active TCI state of the terminal device 110. Alternatively, or in addition, in one example embodiment, the measurement configuration indicates information for enabling the terminal device 110 to generate the at least one measurement report by scaling the measurement result (such as, RSRP).

Alternatively, or in addition, in some embodiments, the higher layer configuration may indicate/include some related parameter, such as a power offset. The power offset may be any power offset to be used by the terminal device 110 in the following procedures. In some embodiments, the power offset is associated with at least one of the following:

- power offset defined in standard requirement;
- power offset as configured by the network device;
- SSB transmit power difference;
- power offset defined in event-driven beam report;
- power offset defined in mobility event;
- ratio between CSI-RS EPRE and SSB EPRE;
- ratio between CSI-RS EPRE and PDSCH EPRE;
- difference in pathloss;
- difference in coupling loss;
- difference in values obtained by transmit power minus received power;
- UE reported power offset;
- difference in transmit antenna/beamforming gains;
- difference in receive antenna/beamforming gains; and
- difference in transmit and receive antenna/beamforming gains.

In some example embodiments, the power offset refers to a single one of the above illustrated parameters. Alternatively, in some other example embodiments, the power offset refers to a combination of the above illustrated parameters.

One example of the power offset is an offset defined by event-driven beam reporting or event-driven cell switch. Another example of the power offset is a transmit power difference between the first network device 120-1 (i.e. the serving cell 130-1) and a second network device 120-2 (i.e., the neighbor cell 130-2).

It is to be understood that the above clarifications for "power offer" are applicable all through the present disclosure. Merely for brevity, the same descriptions are omitted on other parts of the present disclosure.

Alternatively, or in addition, in some embodiments, the measurement configuration indicates information about measurement resources. Specifically, the measurement configuration indicates at least one ID of at least one respective cell to be measured, and at least one RS ID to be measured associated with each of the at least one respective cell.

Additionally, the measurement configuration may be implemented as a mixed configuration in one report configuration. For example, additional PCI or cell ID is configured for the corresponding measurement resources. As one specific example embodiment, the information about measurement resources are indicated by a single resource set.

One exemplary mixed configuration is illustrated as below.

```
CSI-SSB-ResourceSet ::= SEQUENCE {
  csi-SSB-ResourceSetId CSI-SSB-ResourceSetId,
  csi-SSB-ResourceList SEQUENCE (SIZE(1..maxNrofCSI-SSB-
  ResourcePerSet))
  OF {
    cell ServCellIndex - optional
    ssb SSB-Index,
    ...
  }
  ...
}
```

In this specific example embodiment, parameter/field "cell ServCellIndex" is used as an optional parameter, which means that this parameter/field may be configure or not configure according to different application requirements/scenario.

In this specific example embodiment, SSB is used as RS resource only for the purpose of illustration without suggesting any limitations. In other embodiments, SSB may be replaced with any suitable RS (such as, CSI-RS, SRS and so on) or a combination of different RSs.

Further, it also be understood that the message structure and related parameters/fields illustrated in specific example embodiment only for the purpose of illustration without suggesting any limitations. Embodiments according to the present disclosure may be implemented by any suitable signalling/message comprising any suitable parameters/fields.

Additionally, in some example embodiments, in case of the mixed configuration, the terminal device 110 does not expect this resource set is configured with parameter repetition as "ON". Further, if parameter repetition is configured to be "ON", the terminal device 110 may interpret it to be: the same spatial filter is used for resources associated with the same PCI.

Alternatively, in some other embodiments, the measurement configuration may be implemented as separate configuration, i.e., in two or multiple report configurations, where each report configuration corresponds a respective PCI/cell. As one specific example embodiment, the information about measurement resources are indicated by at least one resource set, where each of the at least one resource set is associated with a cell to be measured. Additionally, the linkages between those report configurations are needed to be known by the terminal device 110.

In some example embodiments, in case of mTRP, one report configuration can be associated with two measurement resource sets. In one specific example embodiment, one channel measurement resource set can only contain resources associate with the same PCI.

In some example embodiments, the measurement configuration also may indicate/include related configuration for beam failure recovery (BFR), such as, configurations of BFD RS, candidate beam RS, related threshold and so on.

In some example embodiments, the measurement configuration also may indicate/include related configuration for power headroom report (PHR), UL beam selection, configuration of a candidate SSB/CSI-RS resource pool and so on.

The above illustrated capability-related information and the related measurement configuration are given for illustrative purpose only. It should be understood that any suitable capability-related information and related measurement configuration to enable the following measurement and report procedure may be communicated during this stage. The present disclosure is not limited in this regard.

Still refer to FIG. 2, in some example embodiments, the network device 120 may transmit 230 a message (such as, a DCI message) to trigger a beam measurement at the terminal device 110. The terminal device 110 may receive 240 RS(s) from the network device 120. Then, the terminal device 110 may generate 250 at least one beam measurement report (such as, reported SSBRI/CRI-RSRP) and transmit 260 the at least one beam measurement report to the network device 120 (i.e., in the serving cell 130-1 or in the neighbor cell 130-2).

As discussed above, according to conventional solution, some useless and unnecessary measurement results may be reported from the terminal device 110 to the network device 120. As one example scenario, the terminal device 110 reports neighbor cell beam information when its transmission/reception is associated with the serving cell 130-1. In this event, if L1-RSRP of the neighbor cell RS<highest L1-RSRP of serving cell RS, there is no need to switch to the neighbor cell 130-2, which means this report is not useful.

As another example scenario, the terminal device 110 reports serving cell beam information when its transmission/reception is associated with the neighbor cell 130-2. In this event, if L1-RSRP of the serving cell RS<highest L1-RSRP of neighbor cell RS, there is no need to switch back to the serving cell 130-1, which means this report is not useful.

In order to reduce the number of reporting the useless and unnecessary measurements results, in some example embodiments, the terminal device 110 generates the at least one beam measurement report based on the active TCI state of the terminal device 110.

As discussed above, the active TCI state of the terminal device 110 may correspond to different cells, such as, the serving cell 130-1 or the neighbor cell 130-2. In some example embodiments, the terminal device 110 may generate the at least one beam measurement report based on the specific cell corresponding to the active TCI state. Alternatively, or in addition, the active TCI state of the terminal device 110 may correspond to different transmission directions, such as, an uplink or a downlink. In some example embodiments, the terminal device 110 may generate the at least one beam measurement report based on the transmission direction corresponding to the active TCI state.

It is to be understood that the corresponding cell and corresponding transmission direction are two different aspects with regards to the active TCI state, which means that these two aspects may be combined. For example, the active TCI state may correspond to serving cell UL-only TCI state and neighbor cell DL-only TCI state. Merely for brevity, other combination manners of these two aspects are not illustrated.

For better understanding, some example processes of generating the beam measurement report based on the active TCI state are described as below.

In some example embodiments, if the active TCI state corresponds to the serving sell 130-1 (referred to as a serving cell TCI state sometimes), the report of neighbor cell beam information may be restricted.

It should be understood that restricting the report of neighbor cell beam information may be implemented by several manners.

In one example embodiment, if the active TCI state corresponds to the serving cell 130-1 of the terminal device 110, the at least one measurement report comprises a measurement result for at least one RS associated with the serving cell 130-1.

Alternatively, in another example embodiment, if the active TCI state corresponds to the serving cell 130-1 of the terminal device 110, the at least one measurement report comprises a measurement result for a RS associated with the neighbor cell 130-2 if the signal quality of the RS satisfies a reporting condition. In other words, if the active TCI state corresponds to the serving cell 130-1 of the terminal device 110, the at least one measurement report does not comprise any measurement result for a RS of associated with the neighbor cell 130-2, where the signal quality of the RS fails to satisfy the reporting condition.

In one example embodiment, the reporting condition is that the signal quality of the RS associated with the neighbor cell 130-2 exceeds a pre-configured threshold. Additionally, the pre-configured threshold may be a default threshold (such as, a fix value stipulated by wireless standards, e.g., 3GPP) or configured by the network device 120 and transmitted to the terminal device 110.

Alternatively, in another example embodiment, the reporting condition is that the signal quality of the RS associated with the neighbor cell 130-2 exceeds the highest signal quality of RSs associated with the serving cell 130-1, for example, L1-RSRP of the neighbor cell RS>highest L1-RSRP of serving cell RS.

Alternatively, in a further example embodiment, the reporting condition is that the signal quality of the RS associated with the neighbor cell 130-2 exceeds a sum of the highest signal quality of the RSs associated with the serving cell 130-1 and a pre-configured offset, for example, L1-RSRP of the neighbor cell RS>highest L1-RSRP of serving cell RS+pre-configured offset. In some example embodiments, the power offset is an offset defined by event-driven beam reporting or event-driven cell switch. Alternatively, in some other embodiments, the power offset is a transmit power difference between the first network device 120-1 (i.e. the serving cell 130-1) and a second network device 120-2 (i.e., the neighbor cell 130-2). Additionally, the transmit power difference is an SSB transmit power difference.

Alternatively, in a further example embodiment, if the active TCI state corresponds to the serving cell 130-1 of the terminal device 110, the at least one measurement report comprises a measurement result only for the RSs associated with the serving cell 130-1.

Additionally, in some embodiments, if the at least one measurement report comprises the measurement result only for the RSs of the serving cell 130-1, the number of bits for indicating the RS is determined based on the number of RSs configured to be measured and associated with the serving cell 130-1. That is, the L1-RSRP report format can be updated. In one specific example embodiment, the bitwidth of SSBRI/CRI field can be reduced from ceil(log 2(K)) to ceil(log 2(K1)), where K is the total number of configured resources of the corresponding resource set, and K1 is the total number of configured resources associated with the serving cell 130-1.

Alternatively, the bitwidth of SSBRI/CRI field can be ceil(log 2(max(K1,K2))), where K1 is the total number of configured resources associated with the serving cell 130-1 and K2 is the total number of configured resources associated with the neighbor cell 130-2.

In some example embodiments, if the active TCI state corresponds to the neighbor sell 130-2 (referred to as a neighbor cell TCI state sometimes), the report of serving cell 130-1 beam information may be restricted. Similarly, restricting the report of serving cell 130-1 beam information also may be implemented by several manners.

In one example embodiment, if the active TCI state corresponds to the neighbor cell 130-2 of the terminal device 110, the at least one measurement report comprises a measurement result for at least one RS associated with the neighbor cell 130-2.

Alternatively, in another example embodiment, if the active TCI state corresponds to the neighbor cell 130-2 of the terminal device 110, the at least one measurement report comprises a measurement result for a RS associated with the serving cell 130-1 if the signal quality of the RS satisfies a reporting condition. In other words, if the active TCI state corresponds to the neighbor cell 130-2 of the terminal device 110, the at least one measurement report does not comprise any measurement result for a RS of associated with the serving cell 130-1, where the signal quality of the RS fails to satisfy the reporting condition.

In one example embodiment, the reporting condition is that the reporting condition is that the signal quality of the RS associated with the serving cell 130-1 exceeds a pre-configured threshold. Additionally, the pre-configured threshold may be a default threshold (such as, a fix value stipulated by wireless standards, e.g., 3GPP) or configured by the network device 120 and transmitted to the terminal device 110.

Alternatively, in a further example embodiment, the reporting condition is that the signal quality of the RS associated with the serving cell 130-1 exceeds the highest signal quality of the RSs associated with the neighbor cell 130-2, i.e., L1-RSRP of the serving cell RS>highest L1-RSRP of neighbor cell RS.

Alternatively, in another example embodiment, the reporting condition is that the signal quality of the RS associated with the serving cell 130-1 exceeds a sum of the highest signal quality of the RS associated with the neighbor cell 130-2 and a pre-configured offset, for example, L1-RSRP of the serving cell RS>highest L1-RSRP of neighbor cell RS+pre-configured offset. In some example embodiments, the power offset is an offset defined by event-driven beam reporting or event-driven cell switch. Alternatively, in some other embodiments, the power offset is a transmit power difference between the first network device 120-1 (i.e. the serving cell 130-1) and a second network device 120-2 (i.e., the neighbor cell 130-2). Additionally, the transmit power difference is an SSB transmit power difference.

Alternatively, in a further example embodiments, if the active TCI state corresponds to the neighbor cell 130-2 of the terminal device 110, the at least one measurement report comprises a measurement result only for the RSs associated with the neighbor cell 130-2.

Additionally, in some embodiments, if the at least one measurement report comprises the measurement result only for the RSs of the neighbor cell 130-2, a number of bits for indicating the RS is determined based on the number of RSs configured to be measured and associated with the neighbor cell 130-2. That is, the L1-RSRP report format can be updated. In one specific example embodiment, the bitwidth of SSBRI/CRI field can be reduced from ceil(log 2(K)) to ceil(log 2(K2)), where K is the total number of configured resources of the corresponding resource set and K2 is the total number of configured resources associated with the neighbor cell 130-2.

Alternatively, the bitwidth of SSBRI/CRI field can be ceil(log 2(max(K1,K2))), where K1 is the total number of configured resources associated with the serving cell 130-1 and K2 is the total number of configured resources associated with the neighbor cell 130-2.

In some example embodiments, if the active TCI state corresponds to the uplink transmission (referred to as an UL-only TCI state sometimes), the report of DL beam information may be restricted.

In one example embodiment, if the active TCI state corresponds to an uplink transmission, the at least one measurement report comprises a measurement result for at least one RS configured for the uplink beam selection (i.e., at least one beam suitable for UL). In one example embodiment, the beam suitable for UL can be such beams that are configured/used SSB/CSI-RS for PHR reporting for MPE mitigation.

Alternatively, in some example embodiments, if the active TCI state corresponds to the downlink transmission (referred to as a DL-only TCI state sometimes), the report of UL beam information may be restricted.

In one example embodiment, if the active TCI state corresponds to a downlink transmission, the at least one measurement report comprises a measurement result for at least one RS configured for the downlink beam selection.

In addition, as discussed above, the corresponding cell and corresponding transmission direction are two different aspects with regards to the active TCI state, which means that these two aspects may be used separately or in combined.

As one specific example, the active TCI state corresponds to serving cell UL-only TCI state and neighbor cell DL-only TCI state. In such specific scenario, the at least one measurement report comprises at least one serving beam suitable for UL and at least one neighbor cell beam. In one example embodiment, the beam suitable for UL can be such beams that are configured/used SSB/CSI-RS for PHR reporting for MPE mitigation. Further, it is expected for the terminal device 110 that the configured number of report RS is larger than 1. It is to be understood that other implementations also may be implemented for the joint state. Merely for brevity, other implementations are omitted here.

Alternatively, or in addition, in some example embodiments, the measurement behavior and report content also may be determined based on the active TCI state as discussed below. In this way, useless and unnecessary measurements reports are avoided, and beam selection for currently associated cell of data transmission may be more reasonable.

In one example embodiment, if the at least one measurement report is about L1-SINR and the active TCI state corresponding to the serving cell 130-1, a value of the L1-SINR is determined by using at least one RS associated with the serving cell 130-1 as channel measurement RS and at least one RS associated with the neighbor cell 130-2 as interference measurement.

Alternatively, in another example embodiment, if the at least one measurement report is about L1-SINR and the active TCI state corresponding to the neighbor cell 130-2, a value of the L1-SINR is determined by using at least one RS associated with the neighbor cell 130-2 as channel measurement RS and at least one RS associated with the serving cell 130-1 as interference measurement.

Additionally, in some example embodiments, for configuration of L1-SINR report, two resource sets may be configured, where one resource set is for channel measurement and another resource set is for interference measurement. And the resources in one resource can be associated with the same PCI.

Additionally, in some example embodiments, as one initial configuration, when the active TCI is a serving cell TCI state, the serving cell RS is configured in channel measurement resource set and the neighbor cell RS is configured in interference measurement resource set. After active TCI state being switched from the serving cell TCI state to a neighbor cell TCI state, the channel measurement resource set becomes the interference measurement resource set, and the interference resource set becomes the channel measurement resource set. In one example embodiment, the resource in channel measurement resource (CMR) and the resource in interference measurement resource (IMR) may be 1 to 1 (1-1) mapped. Alternatively, in another example embodiment, all or subset of resources in IMR can be used to calculate interference power, for example, accumulatively sum up interference power, or only consider the highest interference, or averaging top N interference.

Additionally, in some example embodiments, for configuration of LT-SINR report, one resource set may be configured, with mixed both serving cell RS and neighbor cell RS. When the active TCI state corresponds to the serving cell 130-1, the serving cell RS in the resource set is used for channel measurement, the neighbor cell RS in the resource set is used for interference measurement. Further, a number of bits in the L1-SINR report for indicating the RS is determined based on the number of serving cell RSs configured in the resource set. When the active TCI being switched from the serving cell TCI state to a neighbor cell TCI state, the neighbor cell RS in the resource set is used for channel measurement and the serving cell RS in the resource set is used for interference measurement. Further, a number of bits in the L1-SINR report for indicating the RS is determined based on the number of neighbor cell RSs configured in the resource set.

In one example embodiment, if the active TCI state corresponds to the serving cell 130-1 of the terminal device 110, the terminal device 110 performs a measurement by using Quasi Co-location (QCL) assumption of a RS associated with the serving cell 130-1 as the QCL assumption of the RS associated with the neighbor cell 130-2. In addition, the RS associated with the serving cell 130-1 is the RS contained in the active TCI state. Alternatively, the RS associated with the serving cell is the corresponding serving cell RS of the neighbor cell RS as in aforementioned 1-1 CMR/IMR mapping relationship.

Alternatively, in another example embodiment, if the active TCI state corresponds to the neighbor cell 130-2 of the terminal device 110, performing a measurement by using QCL assumption of a RS associated with the neighbor cell 130-2 as the QCL assumption of the RS associated with the serving cell 130-1. In addition, the RS associated with the neighbor cell is the RS contained in the active TCI state. Alternatively, the RS associated with the neighbor cell is the corresponding neighbor cell RS of the serving cell RS as in aforementioned 1-1 CMR/IMR mapping relationship.

In addition, as discussed above, for the scenario of inter-cell, the number of reporting "out of range" will increase due to the transmit power difference. According to the some example embodiments of the present disclosure, the terminal device 110 may scale at least one measurement result by a pre-configured offset based on the active TCI state.

In some example embodiments, if the active TCI state corresponds to the serving cell 130-1 of the terminal device 110, the terminal device 110 scales a measurement result for a RS associated with the neighbor cell 130-2 by the pre-configured offset, for example, scaled RSRP of neighbor cell RS=Measured RSRP of neighbor cell RS+offset. Accordingly, in some example embodiments, if the active TCI state corresponds to the neighbor cell 130-2 of the terminal device 110, the terminal device 110 scales a measurement result for a RS associated with the serving cell 130-1 by the pre-configured offset.

Alternatively, in some example embodiments, if the active TCI state corresponds to the neighbor cell 130-2 of the terminal device 110, the terminal device 110 scales a measurement result for a RS associated with the neighbor cell 130-2 by the pre-configured offset. Accordingly, in some example embodiments, if the active TCI state corresponds to the serving cell 130-1 of the terminal device 110, the terminal device 110 scales a measurement result for a RS associated with the serving cell 130-1 by the pre-configured offset.

In some example embodiments, the power offset is an offset defined by event-driven beam reporting or event-driven cell switch. Alternatively, in some other embodiments, the power offset is a transmit power difference between the first network device 120-1 (i.e. the serving cell 130-1) and a second network device 120-2 (i.e., the neighbor cell 130-2). Additionally, the transmit power difference is a SSB transmit power difference.

In some example embodiments, the terminal device 110 may scale a measurement result for a RS associated with a cell with a lower transmit power by a transmit power difference between the serving cell 130-1 and the neighbor cell 130-2. In other words, the terminal device 110 scales the measurement result depending on which cell has a higher SSB transmit power. For example, if SSB power of cell 1 is the higher one of SSB power of cell 1 and SSB power of cell 2, RSRP of cell 2 RS may be scaled as below: scaled RSRP of cell 2 RS=Measured RSRP of cell 2 RS+SSB power of cell 1−SSB power of cell 2.

In addition to scaling the measurement, the number of reporting "out of range" also may be decreased by an improved format of measurement result as discussed below.

In some example embodiments, the at least one beam measurement report indicates both a first absolute value of a measurement result for the serving cell 130-1 and a second absolute value of a measurement result for the neighbor cell 130-2. Further, such beam measurement report is generated conditionally. One example condition is that a transmit power (such as, a SSB transmit power) in a serving cell 130-1 for a terminal device 110 is different from a transmit power of in a neighbor cell 130-2 for the terminal device 110. Additionally, in some example embodiments, the at least one beam measurement further indicates either a differential measurement result for a RS associated with the serving cell 130-1 relative to the first absolute value or a differential measurement result for a RS associated with the neighbor cell 130-2 relative to the second absolute value.

As one specific example embodiment, if SSB transmit powers of the serving cell 130-1 and the neighbor cell 130-2 are different, always report the PCI-specific reference (absolute) 7-bit L1-RSRP. Further, the differential RSRP is calculated to the reference RSRP reported per PCI.

Two exemplary formats of measurement report are illustrated as below Table 1 and Table 2.

TABLE 1

Another example formats of measurement report

| Fields in UCI | Same SSB transmit power (legacy format) | Different SSB transmit power |
|---|---|---|
| SSBRI#1 | Point to SSB associated with Cell 1 | |
| SSBRI#2 | Point to SSB associated with Cell 2 (one different PCI) | |
| SSBRI#3 | Point to SSB associated with Cell 1 | |
| SSBRI#4 | Point to SSB associated with Cell 2 | |
| RSRP#1 | 7 | 7 |
| Differential RSRP#2 or RSRP#2 | 4 bits (differential with respect to. RSRP#1) | 7 bits (RSRP#2) |
| Differential RSRP#3 | 4 bits (differential with respect to RSRP#1) | 4 bits (differential with respect to RSRP#1) |
| Differential RSRP#4 | 4 bits (differential with respect to RSRP#1) | 4 bits (differential with respect to RSRP#2) |

TABLE 2

Another example formats of measurement report

| Fields in UCI | Same SSB transmit power (legacy format) | Different SSB transmit power |
|---|---|---|
| SSBRI#1 | Point to SSB associated with Cell 1 | |
| SSBRI#2 | Point to SSB associated with Cell 2 (one different PCI) | |
| SSBRI#3 | Point to SSB associated with Cell 3 (another different PCI) | |
| SSBRI#4 | Point to SSB associated with Cell 2 | |
| RSRP#1 | 7 bits | 7 bits |
| Differential RSRP#2 or RSRP#2 | 4 bits (differential with respect to RSRP#1) | 7 bits (RSRP#2) |
| Differential RSRP#3 or RSRP#3 | 4 bits (differential with respect to RSRP#1) | 7 bits (RSRP#3) |
| Differential RSRP#4 | 4 bits (differential with respect to RSRP#1) | 4 bits (differential with respect to RSRP#2) |

As discussed above, the conventional BFR procedure is also needed to be improved.

In some example embodiments, the terminal device 110 is configured with a recovery threshold in a first cell (either the serving cell 130-1 or the neighbor cell 130-2) and obtains a measurement result of a RS associated with a second cell different from the first cell. Then, during a BFR procedure, the terminal device 110 applies the recovery threshold to measurement result obtained for the RS associated with the second cell after scaling the measurement result by a pre-configured offset. In some example embodiments, the power offset is an offset defined by event-driven beam reporting or event-driven cell switch. Alternatively, in some other embodiments, the power offset is a transmit power difference between the first network device 120-1 (i.e. the serving cell 130-1) and a second network device 120-2 (i.e., the neighbor cell 130-2). Additionally, the transmit power difference is a SSB transmit power difference.

In this way, the proper beam may be selected during the BFR procedure.

In one example embodiment, if neighbor cell SSB or neighbor cell CSI-RS is configured as candidate beam RS, the terminal device 110 compares its receive power with the threshold after scaling.

In one specific example embodiment, "powerControlOffsetInterCell" is used as the threshold. In this event, the terminal device 110 applies the $Q_{in,LR}$ threshold to the L1-RSRP measurement obtained for a neighbor cell SSB after scaling a respective SSB reception power with a value provided by powerControlOffsetInterCell. Alternatively, or in addition, the terminal device 110 applies the $Q_{in,LR}$ threshold to the L1-RSRP measurement obtained for a neighbor cell CSI-RS resource after scaling a respective CSI-RS reception power with a value provided by powerControlOffsetSS and powerControlOffsetInterCell.

In another example embodiment, if at least one of the neighbor cell SSBs with SS-RSRP X dB above rsrp-ThresholdSSB amongst the SSBs in candidateBeamRSList or the neighbor cell CSI-RSs with CSI-RSRP X dB above rsrp-ThresholdCSI-RS amongst the CSI-RSs in candidateBeamRSList is available, the terminal device 110 selects an neighbor cell SSB with SS-RSRP X dB above rsrp-ThresholdSSB amongst the SSBs in candidateBeamRSList or a neighbor cell CSI-RS with CSI-RSRP X dB above rsrp-ThresholdCSI-RS amongst the CSI-RSs in candidateBeamRSList:

rsrp-ThresholdSSB: an RSRP threshold for the SpCell beam failure recovery;

rsrp-ThresholdBFR: an RSRP threshold for the SCell beam failure recovery;

candidateBeamRSList: list of candidate beams for SpCell beam failure recovery;

candidateBeamRSSCellList: list of candidate beams for SCell beam failure recovery.

rsrp-ThresholdSSB: an RSRP threshold for the selection of the SSB for 4-step RA type. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;

rsrp-ThresholdCSI-RS: an RSRP threshold for the selection of CSI-RS for 4-step RA type. If the Random Access procedure is initiated for beam failure recovery, rsrp-ThresholdCSI-RS is equal to rsrp-ThresholdSSB in BeamFailureRecoveryConfig IE;

Further, BFR MAC CE may be improved accordingly. BFR MAC CE signaling can be used to report BFR related information to the network device 120. A MAC CE format can at least include the following: AC field, Candidate RS ID filed. Specifically, in some embodiments, field "AC" indicates the presence of the Candidate RS ID field in this octet. If at least one of the neighbor cell SSBs with SS-RSRP X dB above rsrp-ThresholdBFR amongst the SSBs in candidateBeamRSSCellList or the neighbor cell CSI-RSs with CSI-RSRP X dB above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead. Further, in some embodiments, field "Candidate RS ID" is set to the index of a neighbor cell SSB with SS-RSRP X dB above rsrp-ThresholdBFR amongst the SSBs in candidateBeamRSSCellList or to the index of a neighbor cell CSI-RS with CSI-RSRP X dB above rsrp-ThresholdBFR amongst the CSI-RSs in candidateBeamRSSCellList. Index of an SSB or CSI-RS is the index of an entry in candidateBeamRSSCellList corresponding to the SSB or CSI-RS. Index 0 corresponds to the first entry in the candidateBeamRSSCellList, index 1 corresponds to the second entry in the list and so on. The length of this field is 6 bits.

In some embodiments, if neighbor cell RS and serving cell RS are both the BFD RS, when the terminal device 110 estimates hypothetical PDCCH BLER, the ratio of PDCCH EPRE to RS EPRE is assumed as 0 dB. Specifically, for link recovery the ratio of the PDCCH EPRE to corresponding NZP CSI-RS EPRE is assumed as 0 dB. Further, the corresponding RS can be the RS activated or the corresponding RS can be the RS with the highest ERPE if both RSs are activated.

In addition, as discussed above, the conventional solution for reporting PHR is also needed to be improved. In some embodiments, the terminal device 110 generates a power headroom message comprising a first set of power control parameter associated with the serving cell 130-1, the first set of power control parameter comprising a least one power control parameter for a RS associated with the serving cell 130-1. In this way, the beam-specific PHR is supported. In current PHR report format, the reported $P_{CMAX,f,c}$, is defined for carrier f of serving cell c, as well as the reported PH and P-MPR values. If the reported SSBRI/CRI is associated with a neighbor cell c', the reported $P_{CMAX}$, PH and P-MPR should be for the neighbor cell c' too, otherwise there would be misalignment for power control in different cells. Therefore, for enhanced PHR report to facilitate MPE mitigation, multiple sets of power control parameters can be reported and each reported set of $P_{CMAX}$, PH or P-MPR parameters can be associated to a cell with respective PCI which the reported SSBRI/CRI is associated with. It is to be understood that the power control parameter may comprise any suitable parameter(s). One example of the power control parameter is $P_{CMAX,f,c}$, which is specified in 3GPP TS 38.213 and used for calculation of the preceding power headroom (PH) field.

Alternatively, or in addition, in some embodiments, the terminal device 110 generates a PH message comprising a second set of power control parameter associated with the neighbor cell 130-2. In this way, power control for the neighbor cell 130-2 is supported.

In one specific embodiment, $P_{CMAX,f,c}$ is the UE configured maximum output power for carrier f of the neighbor cell 130-2, and further the PH is associated with the neighbor cell 130-2.

In some embodiments, the PH message comprises a plurality of sets of power control parameter corresponding to a plurality of PCIs comprising the first and second PCIs. In one example embodiment, multiple parameters (i.e., $P_{CMAX}$) are reported, where the number of $P_{CMAX}$ reported is related to the number of different PCIs. Specifically, $P_{CMAX,f,c}$ is the defined for carrier f of the cell which the SSBRI/CRI is associated to.

In some embodiments, each of the first and second sets of power control parameter comprises at least one parameter, including the power headroom corresponding to a respective PCI, the power headroom per specific channel or RS (PUCCH, PUSCH, SRS and so on) corresponding to a respective PCI, the power headroom per specific channel or RS (PUCCH, PUSCH, SRS and so on) corresponding to a cell associated with a respective PCI, the maximum transmit power level corresponding to a respective PCI, the maximum transmit power level corresponding to a cell associated with a respective PCI, the maximum power reduction corresponding to the respective PCI, the maximum power reduction corresponding to a cell associated with the respective PCI, a maximum power reduction for the respective RS, a delta power reduction for the respective RS relative to the maximum power reduction, and information indicating whether the respective RS belongs to the serving cell 130-1 or the neighbor cell 130-2.

In one specific example embodiments, power management power reduction (P-MPR) is comprised in the PH message. Specifically, the PH message comprises one common P-MPR per PCI and delta P-MPR per RS ID.

Additionally, in some embodiments, the RS ID is the logic ID to indicate the position of corresponding RS in configured SSB/CSI-RS list for MPE report or for P-MPR report.

Additionally, in some embodiments, additional bit(s) is introduced to indicate whether the reported RS ID refers to a neighbor cell RS. Alternatively, in some embodiments, additional bit(s) is introduced to indicate the exact cell of report RS ID.

Additionally, the terminal device 110 transmits the PH message in response to a TCI state corresponding to a PCI different from the first PCI being activated. In one specific example embodiment, the terminal device 110 transmits the PH message if the TCI state associated with a different PCI other than the current PCI is activated (or indicated) and the SSB transmit power difference is larger than a threshold (or an offset is larger than a threshold).

Example Methods

Figure 3:
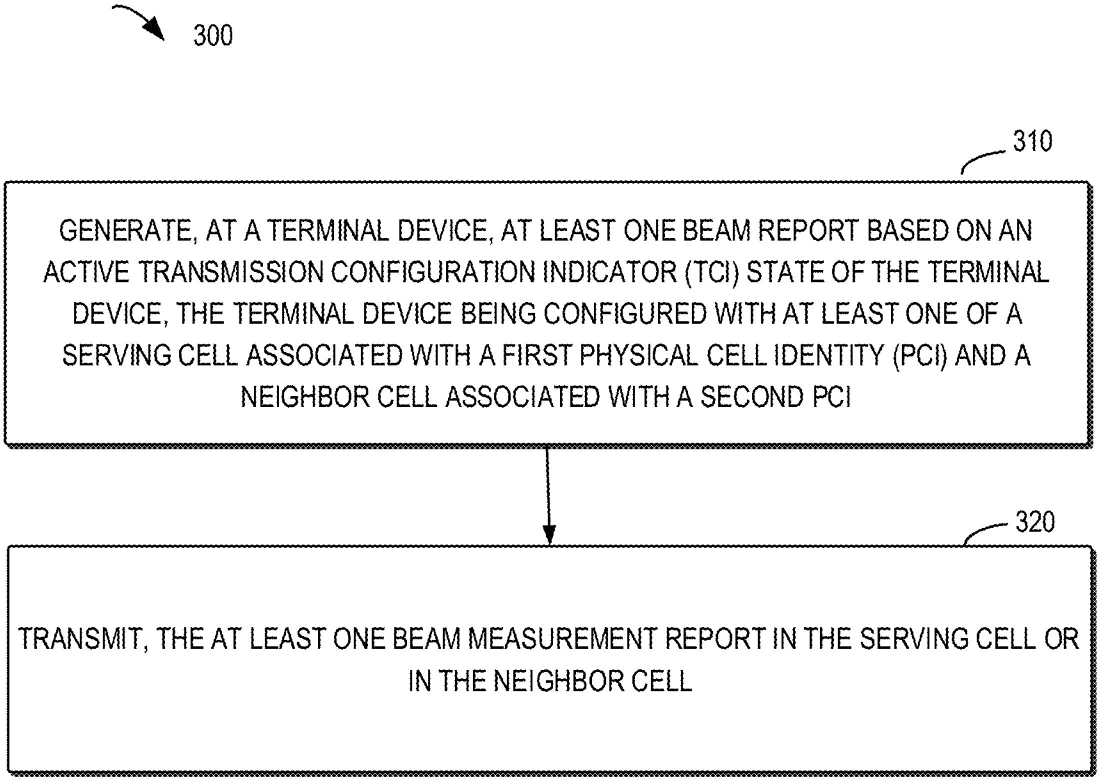
FIG. 3 illustrates an example method performed by the terminal device according to some embodiments of the present disclosure.

FIG. 3 illustrates a flowchart of an example method 300 in accordance with some embodiments of the present disclosure. For example, the method 300 can be implemented at the terminal device 110 as shown in FIG. 1.

At block 310, the terminal device 110 generates at least one beam report based on an active TCI state of the terminal device 110, the terminal device 110 being configured with at least one of a serving cell 130-1 associated with a PCI and a neighbor cell 130-2 associated with a second PCI.

At block 310, the terminal device 110 transmits the at least one beam measurement report in the serving cell 130-1 or in the neighbor cell 130-2.

In some example embodiments, the terminal device 110 generates the at least one beam measurement report based on at least one of the following: a cell corresponding to the active TCI state, the cell being either the serving cell 130-1 or the neighbor cell 130-2; and a transmission direction corresponding to the active TCI state, the transmission direction being either an uplink or a downlink.

In some example embodiments, if the active TCI state corresponds to the serving cell 130-1 of the terminal device 110, the at least one measurement report comprises at least one of the following: a measurement result for at least one RS associated with the serving cell 130-1, a measurement result for a RS associated with the neighbor cell 130-2 if the signal quality of the RS satisfies a reporting condition, or a measurement result only for the RSs associated with the serving cell 130-1.

In some example embodiments, the reporting condition is that the signal quality of the RS associated with the neighbor cell 130-2 exceeds one of the following: a pre-configured threshold, the highest signal quality of RSs associated with the serving cell 130-1, or a sum of the highest signal quality of the RSs associated with the serving cell 130-1 and a pre-configured offset.

In some example embodiments, if the at least one measurement report comprises the measurement result only for the RSs of the serving cell 130-1, a number of bits for indicating the RS is determined based on the number of RSs configured to be measured and associated with the serving cell 130-1.

In some example embodiments, if the active TCI state corresponds to the neighbor cell 130-2 of the terminal device 110, the at least one measurement report comprises at least one of the following: a measurement result for at least one RS associated with the neighbor cell 130-2, a measurement result for a RS associated with the serving cell 130-1 if the signal quality of the RS satisfies a reporting condition, or a measurement result only for the RSs associated with the neighbor cell 130-2.

In some example embodiments, the reporting condition is that the signal quality of the RS associated with the serving cell 130-1 exceeds one of the following: a pre-configured threshold, the highest signal quality of the RSs associated with the neighbor cell 130-2, or an addition of the highest signal quality of the RS associated with the neighbor cell 130-2 and a pre-configured offset.

In some example embodiments, if the at least one measurement report comprises the measurement result only for the RSs of the neighbor cell 130-2, a number of bits for indicating the RS is determined based on the number of RSs configured to be measured and associated with the neighbor cell 130-2.

In some example embodiments, if the active TCI state corresponds to an uplink transmission, the at least one measurement report comprises a measurement result for at least one RS configured for the uplink beam selection.

In some example embodiments, if the active TCI state corresponds to a downlink transmission, the at least one measurement report comprises a measurement result for at least one RS configured for the downlink beam selection.

In some example embodiments, if the at least one measurement report is about L1-SINR, a value of the L1-SINR is determined by: using at least one RS associated with the serving cell 130-1 as channel measurement RS and at least one RS associated with the neighbor cell 130-2 as interference measurement if the active TCI state corresponds to the serving cell 130-1, or using at least one RS associated with the neighbor cell 130-2 as channel measurement RS and at least one RS associated with the serving cell 130-1 as interference measurement if the active TCI state corresponds to the neighbor cell 130-2.

In some example embodiments, if the active TCI state corresponds to the serving cell 130-1 of the terminal device 110, the terminal device 110 performs a measurement by using QCL assumption of a RS associated with the serving cell 130-1 as the QCL assumption of the RS associated with the neighbor cell 130-2, or if the active TCI state corresponds to the neighbor cell 130-2 of the terminal device 110, the terminal device 110 performs a measurement by using QCL assumption of a RS associated with the neighbor cell 130-2 as the QCL assumption of the RS associated with the serving cell 130-1.

In some example embodiments, the terminal device 110 scales based on the active TCI state, at least one measurement result by a pre-configured offset and generates the at least one beam measurement report comprising the scaled measurement result.

In some example embodiments, the pre-configured offset is one of the following: an offset defined by event-driven beam reporting or event-driven cell switch, or a transmit power difference between the serving cell 130-1 and the neighbor cell 130-2.

In some example embodiments, the terminal device 110 scales a measurement result for a RS associated with the neighbor cell 130-2 by the pre-configured offset if the active TCI state corresponds to the serving cell 130-1 of the terminal device 110.

In some example embodiments, the terminal device 110 scales a measurement result for a RS associated with the serving cell 130-1 by the pre-configured offset if the active TCI state corresponds to the neighbor cell 130-2 of the terminal device 110.

In some example embodiments, the terminal device 110 scales a measurement result for a RS associated with the neighbor cell 130-2 by the pre-configured offset if the active TCI state corresponds to the neighbor cell 130-2 of the terminal device 110.

In some example embodiments, the terminal device 110 scales a measurement result for a RS associated with the serving cell 130-1 by the pre-configured offset if the active TCI state corresponds to the serving cell 130-1 of the terminal device 110.

In some example embodiments, the terminal device 110 scales by a transmit power difference between the serving cell 130-1 and the neighbor cell 130-2, a measurement result for a RS associated with a cell with a lower transmit power, and generates the at least one beam measurement report comprising the scaled measurement result.

In some example embodiments, the terminal device 110 transmits capability-related information in the serving cell 130-1 or in the neighbor cell 130-2, the capability-related information indicating whether the terminal device 110 supports to generate the at least one measurement report based on the active TCI state of the terminal device 110.

In some example embodiments, the terminal device 110 receives a measurement configuration indicating at least one of the following: information for enabling the terminal device 110 to generate the at least one measurement report based on the active TCI state of the terminal device 110, or information about measurement resources indicating: at least one ID of at least one respective cell to be measured, and at least one RS ID to be measured associated with each of the at least one respective cell.

In some example embodiments, the information about measurement resources are indicated by a single resource set, or the information about measurement resources are indicated by at least one resource set, each of the at least one resource set associated with a cell to be measured.

Figure 4:
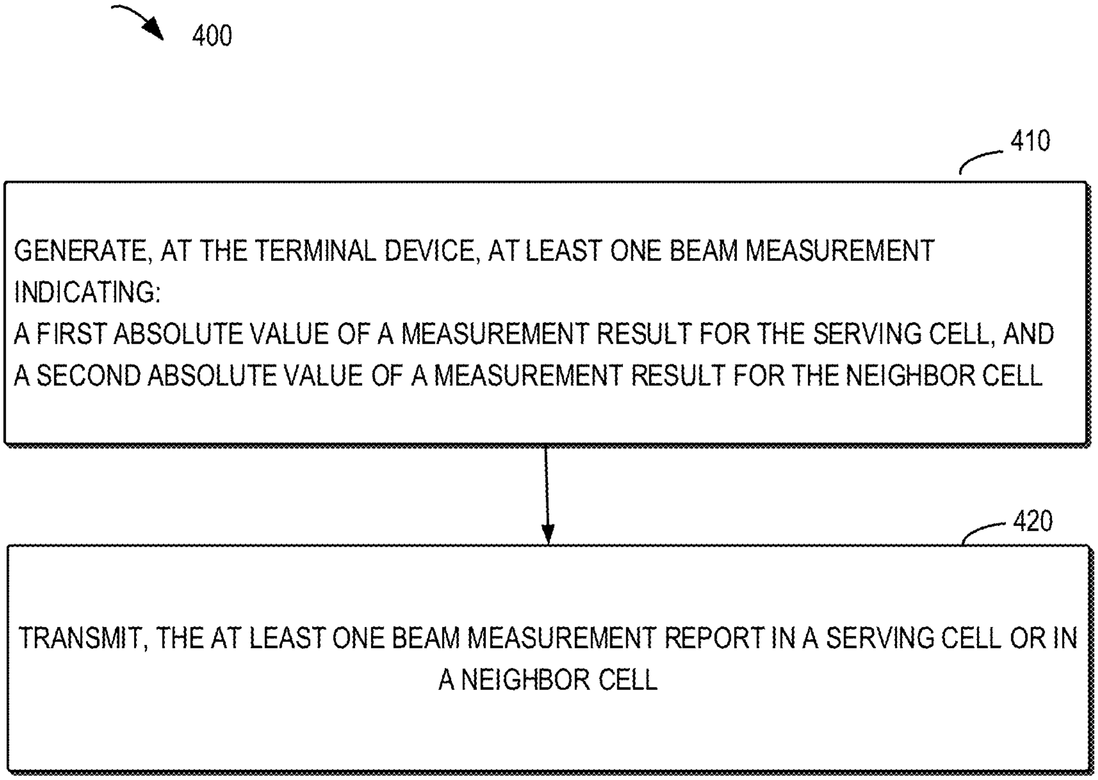
FIG. 4 illustrates an example method performed by the terminal device according to some embodiments of the present disclosure.

FIG. 4 illustrates a flowchart of an example method 400 in accordance with some embodiments of the present disclosure. For example, the method 400 can be implemented at the terminal device 110 as shown in FIG. 1.

At block 410, the terminal device 110 generates at least one beam measurement report indicating: a first absolute value of a measurement result for the serving cell 130-1, and a second absolute value of a measurement result for the neighbor cell 130-2.

At block 420, the terminal device 110 transmits the at least one beam measurement report in a serving cell 130-1 or in a neighbor cell 130-2.

In some example embodiments, if a transmit power in a serving cell 130-1 for a terminal device 110 is different from a transmit power of in a neighbor cell 130-1 for the terminal device 110, the terminal device 110 generates at the terminal device, at least one beam measurement indicating: a first absolute value of a measurement result for the serving cell, and a second absolute value of a measurement result for the neighbor cell. Further, the terminal device 110 transmits the at least one beam measurement report in the serving cell or in the neighbor cell.

In some example embodiments, the at least one beam measurement further indicates at least one of the following: a differential measurement result for a RS associated with the serving cell 130-1 relative to the first absolute value, and a differential measurement result for a RS associated with the neighbor cell 130-2 relative to the second absolute value.

Figure 5:
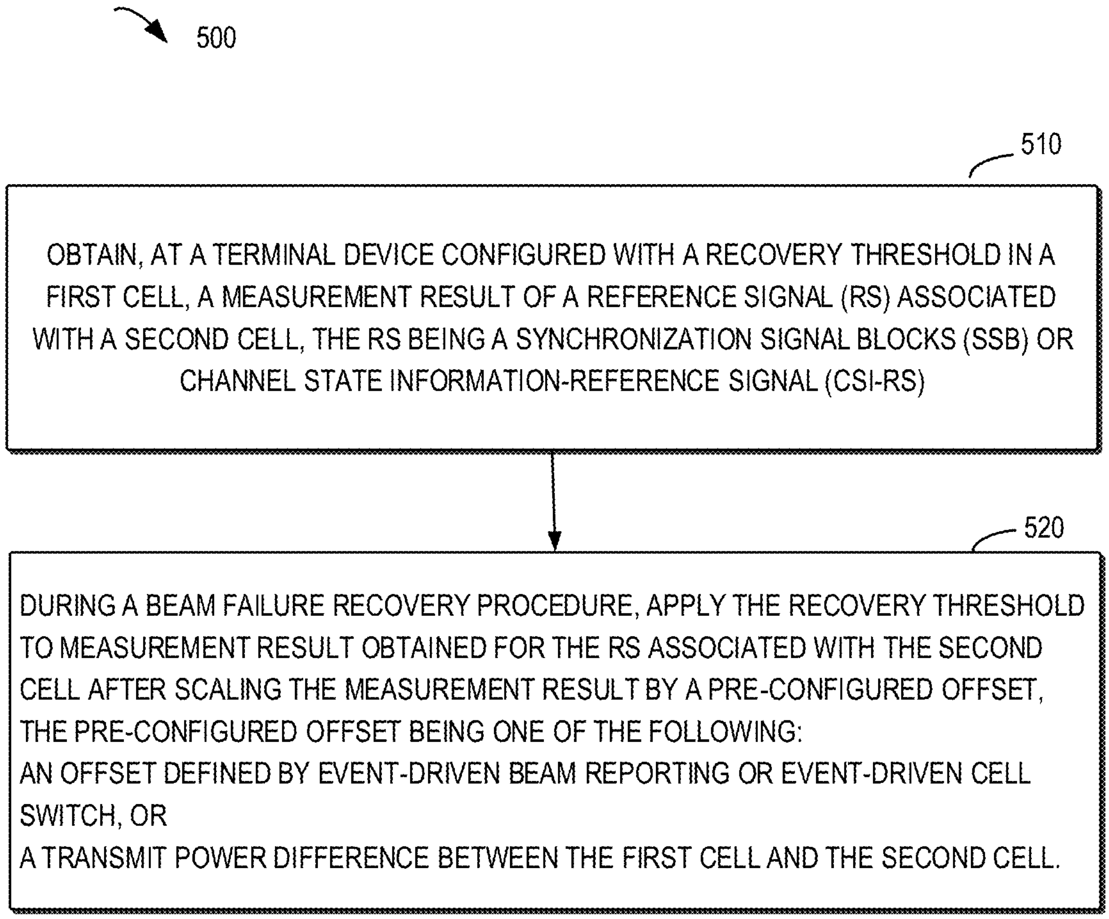
FIG. 5 illustrates an example method performed by the terminal device according to some embodiments of the present disclosure.

FIG. 5 illustrates a flowchart of an example method 500 in accordance with some embodiments of the present disclosure. For example, the method 500 can be implemented at the terminal device 110 as shown in FIG. 1.

At block 510, the terminal device 110 configured with a recovery threshold in a first cell obtains a measurement result of a RS associated with a second cell, the RS being a SSB or CSI-RS.

At block 510, during a beam failure recovery procedure, the terminal device 110 applies the recovery threshold to measurement result obtained for the RS associated with the second cell after scaling the measurement result by a pre-configured offset, the pre-configured offset being one of the following: an offset defined by event-driven beam reporting or event-driven cell switch, or a transmit power difference between the first cell and the second cell.

Figure 6:
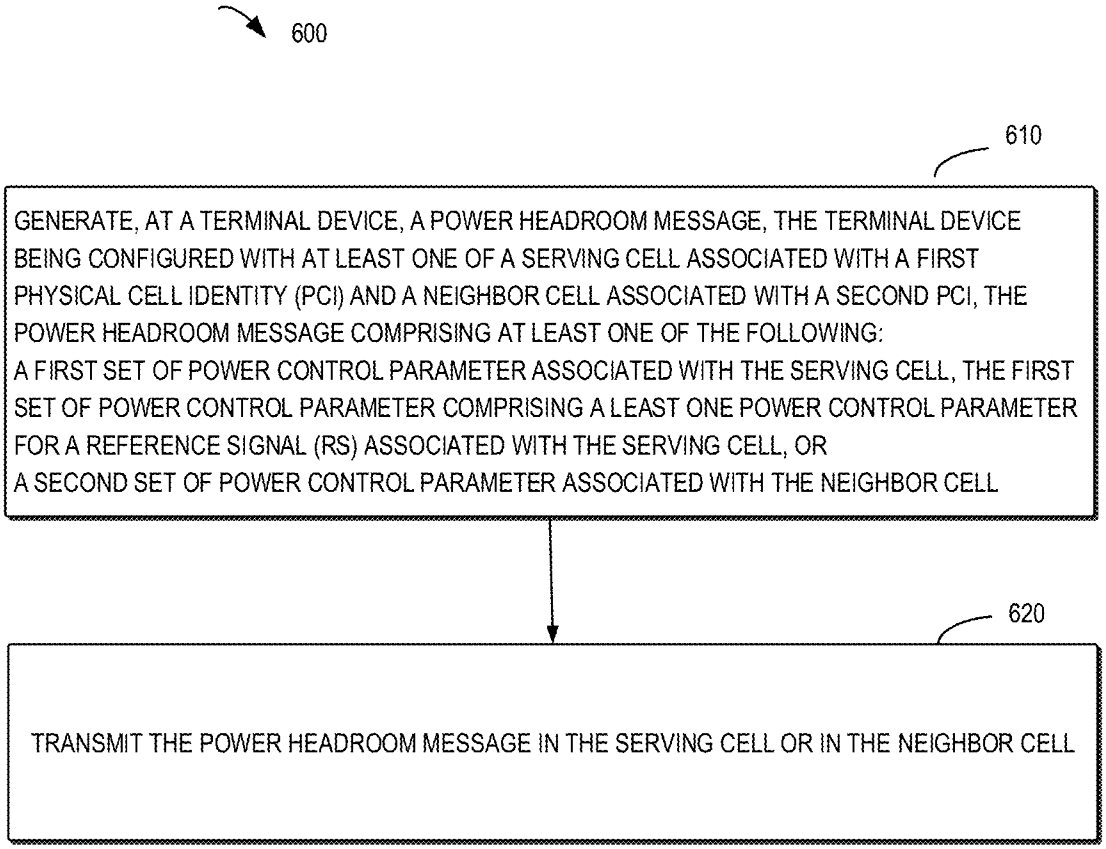
FIG. 6 illustrates an example method performed by the terminal device according to some embodiments of the present disclosure.

FIG. 6 illustrates a flowchart of an example method 600 in accordance with some embodiments of the present disclosure. For example, the method 600 can be implemented at the terminal device 110 as shown in FIG. 1.

At block 610, the terminal device 110 generates a power headroom message, the terminal device 110 being configured with at least one of a serving cell 130-1 associated with a first PCI and a neighbor cell 130-2 associated with a second PCI, the power headroom message comprising at least one of the following: a first set of power control parameter associated with the serving cell 130-1, the first set of power control parameter comprising a least one power control parameter for a RS associated with the serving cell 130-1, or a second set of power control parameter associated with the neighbor cell 130-2.

At block 620, the terminal device 110 transmits the power headroom message in the serving cell 130-1 or in the neighbor cell 130-2.

In some example embodiments, the power headroom message comprises a plurality of sets of power control parameter corresponding to a plurality of PCIs comprising the first and second PCIs.

In some example embodiments, each of the first and second sets of power control parameter comprises at least one of the following: the maximum transmit power level corresponding to a respective PCI, the maximum power reduction corresponding to the respective PCI, the power headroom corresponding to the respective PCI, a delta power reduction for the respective RS relative to the maximum power reduction, or information indicating whether the respective RS belongs to the serving cell 130-1 or the neighbor cell 130-2.

In some example embodiments, the terminal device 110 transmits the power headroom message in response to a TCI state corresponding to a PCI different from the first PCI being activated.

Figure 7:
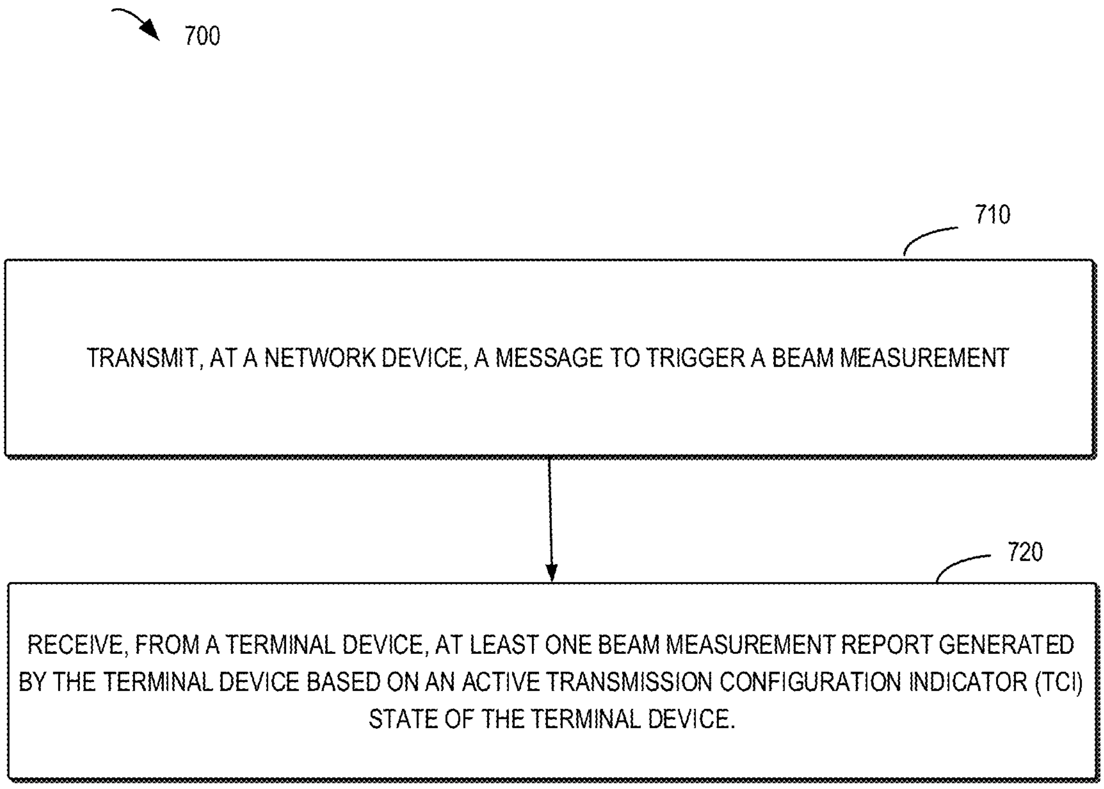
FIG. 7 illustrates an example method performed by the network device according to some embodiments of the present disclosure.

FIG. 7 illustrates a flowchart of an example method 700 in accordance with some embodiments of the present disclosure. For example, the method 700 can be implemented at the network device 120 as shown in FIG. 1.

At block 710, the network device 120 (either a first network device 120-1 providing a serving cell 130-1 associated with a first PCI or a second device providing a neighbor cell 130-2 associated with a second PCI) transmits a message to trigger a beam measurement.

At block 720, the network device 120 receives from a terminal device 110, at least one beam measurement report generated by the terminal device 110 based on an active TCI state of the terminal device 110.

In some example embodiments, the network device 120 receives from the terminal device 110, capability-related information indicating whether the terminal device 110 supports to generate the at least one measurement report based on the active TCI state of the terminal device 110.

In some example embodiments, the network device 120 transmits, to the terminal device 110, a measurement configuration indicating at least one of the following: information for enabling the terminal device 110 to generate the at least one measurement report based on the active TCI state of the terminal device 110, or information about measurement resources indicating: at least one ID of at least one respective cell to be measured, and at least one RS ID to be measured associated with each of the at least one respective cell.

In some example embodiments, the information about measurement resources are indicated by a single resource set, or the information about measurement resources are indicated by at least one resource set, each of the at least one resource set associated with a cell to be measured.

Figure 8:
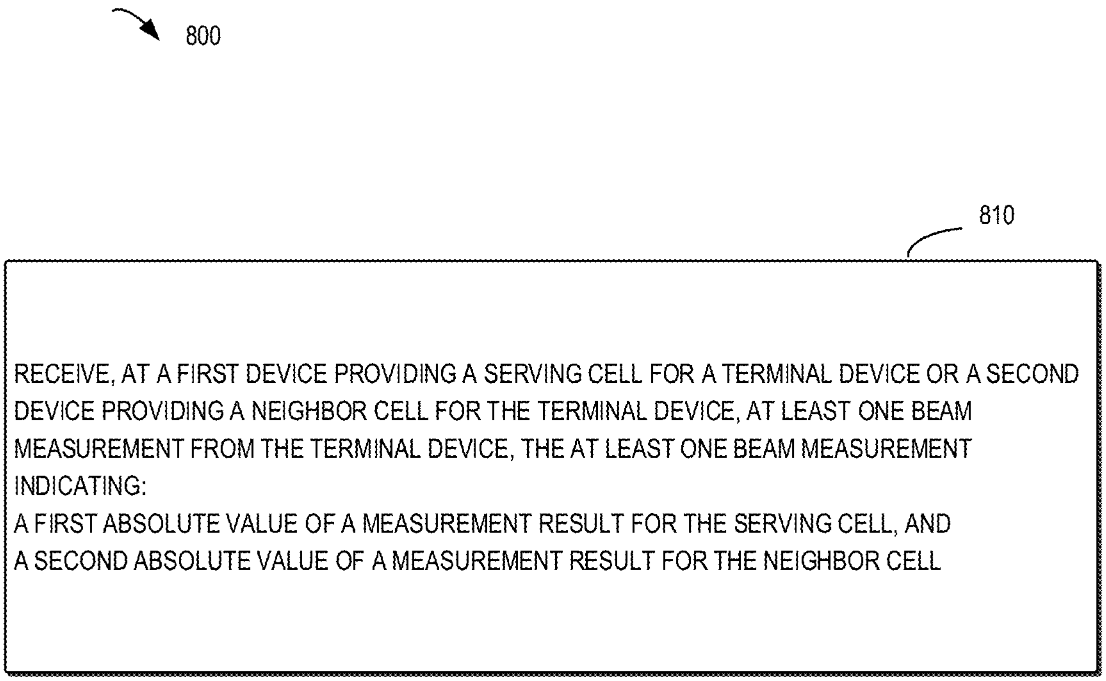
FIG. 8 illustrates an example method performed by the network device according to some embodiments of the present disclosure.

FIG. 8 illustrates a flowchart of an example method 800 in accordance with some embodiments of the present disclosure. For example, the method 800 can be implemented at the network device 120 as shown in FIG. 1.

At block 810, the network device 120 (either a first network device 120-1 providing a serving cell 130-1 associated with a first PCI or a second device providing a neighbor cell 130-2 associated with a second PCI) receives at least one beam measurement from the terminal device 110, the at least one beam measurement report indicating: a first absolute value of a measurement result for the serving cell 130-1, and a second absolute value of a measurement result for the neighbor cell 130-2.

In some example embodiments, the network device 120 (either a first network device 120-1 providing a serving cell 130-1 associated with a first PCI or a second device providing a neighbor cell 130-2 associated with a second PCI) receives at least one beam measurement from the terminal device 110, the at least one beam measurement report indicating: a first absolute value of a measurement result for the serving cell 130-1, and a second absolute value of a measurement result for the neighbor cell 130-2, wherein a transmit power of the first device is different from a transmit power of the second device.

In some example embodiments, the at least one beam measurement further indicates at least one of the following: a delta measurement result for a RS associated with the serving cell 130-1 relative to the first absolute value, and a delta measurement result for a RS associated with the neighbor cell 130-2 relative to the second absolute value.

Figure 9:
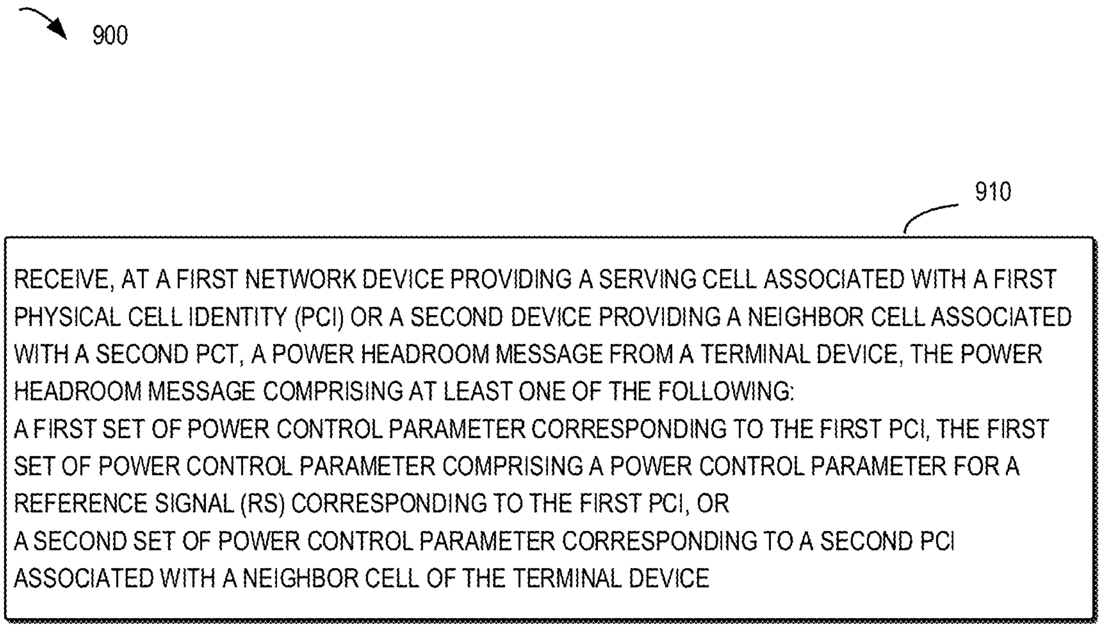
FIG. 9 illustrates an example method performed by the network device according to some embodiments of the present disclosure.

FIG. 9 illustrates a flowchart of an example method 900 in accordance with some embodiments of the present disclosure. For example, the method 900 can be implemented at the network device 120 as shown in FIG. 1.

At block 910, the network device 120 (either a first network device 120-1 providing a serving cell 130-1 associated with a first PCI or a second device providing a neighbor cell 130-2 associated with a second PCI) receives a power headroom message from a terminal device 110, the power headroom message comprising at least one of the following: a first set of power control parameter corresponding to the first PCI, the first set of power control parameter comprising a power control parameter for a RS corresponding to the first PCI, or a second set of power control parameter corresponding to a second PCI associated with a neighbor cell 130-2 of the terminal device 110.

In some example embodiments, the power headroom message comprises a plurality of sets of power control parameter corresponding to a plurality of PCIs comprising the first and second PCIs.

In some example embodiments, each of the first and second sets of power control parameter comprises at least one of the following: the maximum transmit power level corresponding to a respective PCI, the maximum power reduction corresponding to the respective PCI, the power headroom corresponding to the respective PCI, a delta power reduction for the respective RS relative to the maximum power reduction, or information indicating whether the respective RS belongs to the serving cell 130-1 or the neighbor cell 130-2.

Example Devices

In some example embodiments, the terminal device 110 comprises circuitry configured to: generates at least one beam report based on an active TCI state of the terminal device 110, the terminal device 110 being configured with at least one of a serving cell 130-1 associated with a PCI and a neighbor cell 130-2 associated with a second PCI; and transmit, the at least one beam measurement report in the serving cell 130-1 or in the neighbor cell 130-2.

In some example embodiments, the circuitry is further configured to: generate the at least one beam measurement report based on at least one of the following: a cell corresponding to the active TCI state, the cell being either the serving cell 130-1 or the neighbor cell 130-2; and a transmission direction corresponding to the active TCI state, the transmission direction being either an uplink or a downlink.

In some example embodiments, if the active TCI state corresponds to the serving cell 130-1 of the terminal device 110, the at least one measurement report comprises at least one of the following: a measurement result for at least one RS associated with the serving cell 130-1, a measurement result for a RS associated with the neighbor cell 130-2 if the signal quality of the RS satisfies a reporting condition, or a measurement result only for the RSs associated with the serving cell 130-1.

In some example embodiments, the reporting condition is that the signal quality of the RS associated with the neighbor cell 130-2 exceeds one of the following: a pre-configured threshold, the highest signal quality of RSs associated with the serving cell 130-1, or a sum of the highest signal quality of the RSs associated with the serving cell 130-1 and a pre-configured offset.

In some example embodiments, if the at least one measurement report comprises the measurement result only for the RSs of the serving cell 130-1, a number of bits for indicating the RS is determined based on the number of RSs configured to be measured and associated with the serving cell 130-1.

In some example embodiments, if the active TCI state corresponds to the neighbor cell 130-2 of the terminal device 110, the at least one measurement report comprises at least one of the following: a measurement result for at least one RS associated with the neighbor cell 130-2, a measurement result for a RS associated with the serving cell 130-1 if the signal quality of the RS satisfies a reporting condition, or a measurement result only for the RSs associated with the neighbor cell 130-2.

In some example embodiments, the reporting condition is that the signal quality of the RS associated with the serving cell 130-1 exceeds one of the following: a pre-configured threshold, the highest signal quality of the RSs associated with the neighbor cell 130-2, or an addition of the highest signal quality of the RS associated with the neighbor cell 130-2 and a pre-configured offset.

In some example embodiments, if the at least one measurement report comprises the measurement result only for the RSs of the neighbor cell 130-2, a number of bits for indicating the RS is determined based on the number of RSs configured to be measured and associated with the neighbor cell 130-2.

In some example embodiments, if the active TCI state corresponds to an uplink transmission, the at least one measurement report comprises a measurement result for at least one RS configured for the uplink beam selection.

In some example embodiments, if the active TCI state corresponds to a downlink transmission, the at least one measurement report comprises a measurement result for at least one RS configured for the downlink beam selection.

In some example embodiments, if the at least one measurement report is about L1-SINR, a value of the L1-SINR is determined by: using at least one RS associated with the serving cell 130-1 as channel measurement RS and at least one RS associated with the neighbor cell 130-2 as interference measurement if the active TCI state corresponds to the serving cell 130-1, or using at least one RS associated with the neighbor cell 130-2 as channel measurement RS and at least one RS associated with the serving cell 130-1 as interference measurement if the active TCI state corresponds to the neighbor cell 130-2.

In some example embodiments, the circuitry is further configured to: if the active TCI state corresponds to the serving cell 130-1 of the terminal device 110 perform a measurement by using QCL assumption of a RS associated with the serving cell 130-1 as the QCL assumption of the RS associated with the neighbor cell 130-2, or if the active TCI state corresponds to the neighbor cell 130-2 of the terminal device 110, perform a measurement by using QCL assumption of a RS associated with the neighbor cell 130-2 as the QCL assumption of the RS associated with the serving cell 130-1.

In some example embodiments, the circuitry is further configured to: scale based on the active TCI state, at least one measurement result by a pre-configured offset and generate the at least one beam measurement report comprising the scaled measurement result.

In some example embodiments, the pre-configured offset is one of the following: an offset defined by event-driven beam reporting or event-driven cell switch, or a transmit power difference between the serving cell 130-1 and the neighbor cell 130-2.

In some example embodiments, the circuitry is further configured to: scale a measurement result for a RS associated with the neighbor cell 130-2 by the pre-configured offset if the active TCI state corresponds to the serving cell 130-1 of the terminal device 110.

In some example embodiments, the circuitry is further configured to: scale a measurement result for a RS associated with the serving cell 130-1 by the pre-configured offset if the active TCI state corresponds to the neighbor cell 130-2 of the terminal device 110.

In some example embodiments, the circuitry is further configured to: scale a measurement result for a RS associated with the neighbor cell 130-2 by the pre-configured offset if the active TCI state corresponds to the neighbor cell 130-2 of the terminal device 110.

In some example embodiments, the circuitry is further configured to: scale a measurement result for a RS associated with the serving cell 130-1 by the pre-configured offset if the active TCI state corresponds to the serving cell 130-1 of the terminal device 110.

In some example embodiments, the circuitry is further configured to: scale by a transmit power difference between the serving cell 130-1 and the neighbor cell 130-2, a measurement result for a RS associated with a cell with a lower transmit power, and generates the at least one beam measurement report comprising the scaled measurement result.

In some example embodiments, the circuitry is further configured to: transmit capability-related information in the serving cell 130-1 or in the neighbor cell 130-2, the capability-related information indicating whether the terminal device 110 supports to generate the at least one measurement report based on the active TCI state of the terminal device 110.

In some example embodiments, the circuitry is further configured to: receive a measurement configuration indicating at least one of the following: information for enabling the terminal device 110 to generate the at least one measurement report based on the active TCI state of the terminal device 110, or information about measurement resources indicating: at least one ID of at least one respective cell to be measured, and at least one RS ID to be measured associated with each of the at least one respective cell.

In some example embodiments, the information about measurement resources are indicated by a single resource set, or the information about measurement resources are indicated by at least one resource set, each of the at least one resource set associated with a cell to be measured.

In some example embodiments, the terminal device 110 comprises circuitry configured to: the terminal device 110 generates at least one beam measurement report indicating: a first absolute value of a measurement result for the serving cell 130-1, and a second absolute value of a measurement result for the neighbor cell 130-2; and transmit the at least one beam measurement report in a serving cell 130-1 or in a neighbor cell 130-2.

In some example embodiments, the terminal device 110 comprises circuitry configured to: if a transmit power in a serving cell 130-1 for a terminal device 110 is different from a transmit power of in a neighbor cell 130-1 for the terminal device 110, generate at the terminal device, at least one beam measurement indicating: a first absolute value of a measurement result for the serving cell, and a second absolute value of a measurement result for the neighbor cell; and transmit the at least one beam measurement report in the serving cell or in the neighbor cell.

In some example embodiments, the at least one beam measurement further indicates at least one of the following: a differential measurement result for a RS associated with the serving cell 130-1 relative to the first absolute value, and a differential measurement result for a RS associated with the neighbor cell 130-2 relative to the second absolute value.

In some example embodiments, the terminal device 110 configured with a recovery threshold in a first cell, comprises circuitry configured to: obtain a measurement result of a RS associated with a second cell, the RS being a SSB or CSI-RS; and during a beam failure recovery procedure, applies the recovery threshold to measurement result obtained for the RS associated with the second cell after scaling the measurement result by a pre-configured offset, the pre-configured offset being one of the following: an offset defined by event-driven beam reporting or event-driven cell switch, or a transmit power difference between the first cell and the second cell.

In some example embodiments, the terminal device 110 comprises circuitry configured to: generate a power headroom message, the terminal device 110 being configured with at least one of a serving cell 130-1 associated with a first PCI and a neighbor cell 130-2 associated with a second PCI, the power headroom message comprising at least one of the following: a first set of power control parameter associated with the serving cell 130-1, the first set of power control parameter comprising a least one power control parameter for a RS associated with the serving cell 130-1, or a second set of power control parameter associated with the neighbor cell 130-2; and transmit the power headroom message in the serving cell 130-1 or in the neighbor cell 130-2.

In some example embodiments, the power headroom message comprises a plurality of sets of power control parameter corresponding to a plurality of PCIs comprising the first and second PCIs.

In some example embodiments, each of the first and second sets of power control parameter comprises at least one of the following: the maximum transmit power level corresponding to a respective PCI, the maximum power reduction corresponding to the respective PCI, the power headroom corresponding to the respective PCI, a delta power reduction for the respective RS relative to the maximum power reduction, or information indicating whether the respective RS belongs to the serving cell 130-1 or the neighbor cell 130-2.

In some example embodiments, the circuitry is further configured to: transmit the power headroom message in response to a TCI state corresponding to a PCI different from the first PCI being activated.

In some example embodiments, the network device 120 (either a first network device 120-1 providing a serving cell 130-1 associated with a first PCI or a second device providing a neighbor cell 130-2 associated with a second PCI), comprises circuitry configured to: transmit a message to trigger a beam measurement; and receive from a terminal device 110, at least one beam measurement report generated by the terminal device 110 based on an active TCI state of the terminal device 110.

In some example embodiments, the circuitry is further configured to: receive from the terminal device 110, capability-related information indicating whether the terminal device 110 supports to generate the at least one measurement report based on the active TCI state of the terminal device 110.

In some example embodiments, the circuitry is further configured to: transmit, to the terminal device 110, a measurement configuration indicating at least one of the following: information for enabling the terminal device 110 to generate the at least one measurement report based on the active TCI state of the terminal device 110, or information about measurement resources indicating: at least one ID of at least one respective cell to be measured, and at least one RS ID to be measured associated with each of the at least one respective cell.

In some example embodiments, the information about measurement resources are indicated by a single resource set, or the information about measurement resources are indicated by at least one resource set, each of the at least one resource set associated with a cell to be measured.

In some example embodiments, the network device 120 (either a first network device 120-1 providing a serving cell 130-1 associated with a first PCI or a second device providing a neighbor cell 130-2 associated with a second PCI), comprises circuitry configured to: receive at least one beam measurement from the terminal device 110, the at least one beam measurement report indicating: a first absolute value of a measurement result for the serving cell 130-1, and a second absolute value of a measurement result for the neighbor cell 130-2.

In some example embodiments, the network device 120 (either a first network device 120-1 providing a serving cell 130-1 associated with a first PCI or a second device providing a neighbor cell 130-2 associated with a second PCI), comprises circuitry configured to: receive at least one beam measurement from the terminal device 110, the at least one beam measurement report indicating: a first absolute value of a measurement result for the serving cell 130-1, and a second absolute value of a measurement result for the neighbor cell 130-2, wherein a transmit power of the first device is different from a transmit power of the second device.

In some example embodiments, the at least one beam measurement further indicates at least one of the following: a delta measurement result for a RS associated with the serving cell 130-1 relative to the first absolute value, and a delta measurement result for a RS associated with the neighbor cell 130-2 relative to the second absolute value.

In some example embodiments, the network device 120 (either a first network device 120-1 providing a serving cell 130-1 associated with a first PCI or a second device providing a neighbor cell 130-2 associated with a second PCI), comprises circuitry configured to: receive a power headroom message from a terminal device 110, the power headroom message comprising at least one of the following: a first set of power control parameter corresponding to the first PCI, the first set of power control parameter comprising a power control parameter for a RS corresponding to the first PCI, or a second set of power control parameter corresponding to a second PCI associated with a neighbor cell 130-2 of the terminal device 110.

In some example embodiments, the power headroom message comprises a plurality of sets of power control parameter corresponding to a plurality of PCIs comprising the first and second PCIs.

In some example embodiments, each of the first and second sets of power control parameter comprises at least one of the following: the maximum transmit power level corresponding to a respective PCI, the maximum power reduction corresponding to the respective PCI, the power headroom corresponding to the respective PCI, a delta power reduction for the respective RS relative to the maximum power reduction, or information indicating whether the respective RS belongs to the serving cell 130-1 or the neighbor cell 130-2.

Figure 10:
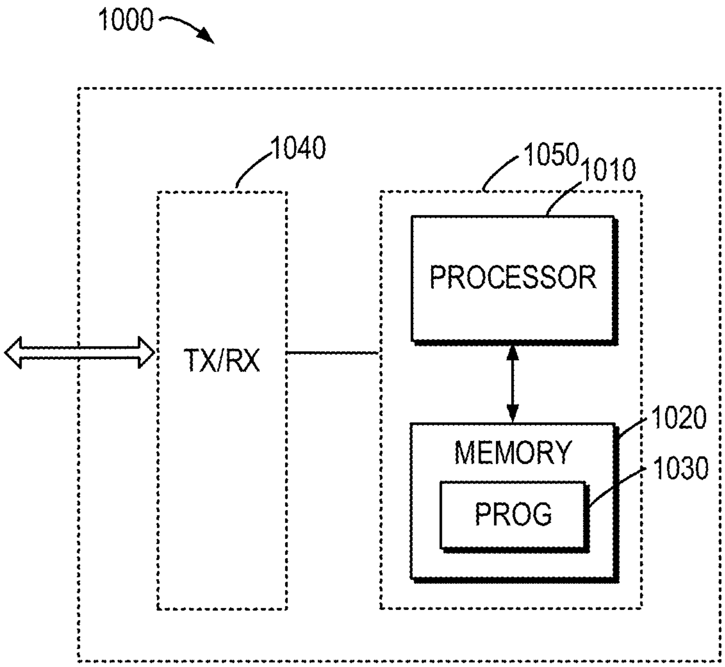
FIG. 10 illustrates a simplified block diagram of an apparatus that is suitable for implementing example embodiments of the present disclosure.

FIG. 10 is a simplified block diagram of a device 1000 that is suitable for implementing embodiments of the present disclosure. The device 1000 can be considered as a further example implementation of the terminal 110 and the network devices 120-1 and 120-2 as shown in FIG. 1. Accordingly, the device 1000 can be implemented at or as at least a part of the terminal 110 and the network devices 120-1 and 120-2.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1010 stores at least a part of a program 1030. The TX/RX 1040 is for bidirectional communications. The TX/RX 1040 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1030 is assumed to include program instructions that, when executed by the associated processor 1010, enable the device 1000 to operate in accordance with the embodiments of the present disclosure, as discussed herein with reference to FIGS. 3-9. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1020 may form processing means 1050 adapted to implement various embodiments of the present disclosure.

The memory 1020 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1020 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 11-22. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

We claim:

1. A method performed by a User Equipment (UE), the method comprising:

sending, to a network, a first Radio Resource Control (RRC) message comprising UE capability information element comprising first information related to support of a Layer 1 Reference Signal Received Power (L1-RSRP) measurement;

receiving, from the network, an offset parameter and a threshold parameter;

receiving a first Channel State Information Reference Signal (CSI-RS) transmitted with a first transmit power determined based on the offset parameter, the first CSI-RS being Quasi Co-Located (QCLed) with a Synchronization Signal Block (SSB) of a first cell having a first Physical Cell Identifier (PCI);

receiving a second CSI-RS transmitted with a second transmit power determined based on the offset parameter, the second CSI-RS being QCLed with the SSB of a serving cell having a second PCI, wherein the offset parameter is related to a ratio between a CSI-RS Energy Per Resource Element (EPRE) and a SSB EPRE, wherein the first cell is different from the serving cell, and wherein the first PCI is different from the second PCI;

performing a first L1-RSRP measurement for the first CSI-RS being QCLed with the SSB of the first cell having the first PCI;

performing a second L1-RSRP measurement for the second CSI-RS being QCLed with the SSB of the serving cell having the second PCI;

scaling, with a value provided by the offset parameter, a reception power of the first CSI-RS being QCLed with the SSB of the first cell having the first PCI; and applying the threshold parameter to the first L1-RSRP measurement for the first CSI-RS being QCLed with the SSB of the first cell having the first PCI.

2. The method according to claim 1, wherein the UE capability information element further comprises a parameter which is related to support of inter-cell Beam Management (BM) and Multiple Transmission and Reception Point (mTRP).

3. The method according to claim 1, wherein the UE capability information element further comprises a parameter which is related to, for the L1-RSRP measurement, a maximum number of PCIs different from the second PCI of the serving cell.

4. The method according to claim 1, wherein the first transmit power is different from the second transmit power.

5. A User Equipment (UE) comprising:

a memory; and a processor coupled with the memory, wherein the processor is configured to:

send, to a network, a first Radio Resource Control (RRC) message comprising UE capability information element comprising first information related to support of a Layer 1 Reference Signal Received Power (L1-RSRP) measurement;

receive, from the network, an offset parameter and a threshold parameter;

receive a first Channel State Information Reference Signal (CSI-RS) transmitted with a first transmit power determined based on the offset parameter, the first CSI-RS being Quasi Co-Located (QCLed) with a Synchronization Signal Block (SSB) of a first cell having a first Physical Cell Identifier (PCI);

receive a second CSI-RS transmitted with a second transmit power determined based on the offset parameter, the second CSI-RS being QCLed with the SSB of a serving cell having a second PCI, wherein the offset parameter is related to a ratio between a CSI-RS Energy Per Resource Element (EPRE) and a SSB EPRE, wherein the first cell is different from the serving cell, and wherein the first PCI is different from the second PCI;

perform a first L1-RSRP measurement for the first CSI-RS being QCLed with the SSB of the first cell having the first PCI;

perform a second L1-RSRP measurement for the second CSI-RS being QCLed with the SSB of the serving cell having the second PCI;

scale, with a value provided by the offset parameter, a reception power of the first CSI-RS being QCLed with the SSB of the first cell having the first PCI; and apply the threshold parameter to the first L1-RSRP measurement for the first CSI-RS being QCLed with the SSB of the first cell having the first PCI.

6. The UE according to claim 5, wherein the UE capability information element further comprises a parameter which is related to support of inter-cell Beam Management (BM) and Multiple Transmission and Reception Point (mTRP).

7. The UE according to claim 5, wherein the UE capability information element further comprises a parameter which is related to, for the L1-RSRP measurement, a maximum number of first PCIs different from the second PCI of the serving cell.

8. The UE according to claim 5, wherein the first transmit power is different from the second transmit power.

* * * * *